United States Patent
Hamada et al.

(10) Patent No.: US 7,857,867 B2
(45) Date of Patent: Dec. 28, 2010

(54) SEALED BATTERY AND METHOD OF MANUFACTURING THE SEALED BATTERY

(75) Inventors: Shinji Hamada, Toyohashi (JP);
Takashi Asahina, Toyohashi (JP);
Toyohiko Eto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 942 days.

(21) Appl. No.: 11/663,747

(22) PCT Filed: Sep. 7, 2005

(86) PCT No.: PCT/JP2005/016885

§ 371 (c)(1),
(2), (4) Date: Mar. 26, 2007

(87) PCT Pub. No.: WO2006/035597

PCT Pub. Date: Apr. 6, 2006

(65) Prior Publication Data

US 2008/0038632 A1    Feb. 14, 2008

(30) Foreign Application Priority Data

Sep. 30, 2004    (JP)    ............................. 2004-288268

(51) Int. Cl.
*H01M 2/02*    (2006.01)
*H01M 2/26*    (2006.01)
*H01M 10/38*    (2006.01)
*H01M 10/40*    (2006.01)

(52) U.S. Cl. ...................... 29/623.2; 429/176; 429/185; 429/211

(58) Field of Classification Search ........................ None
See application file for complete search history.

(56) References Cited

U.S. PATENT DOCUMENTS

| 6,946,219 | B2 * | 9/2005 | Hamada et al. | ............. | 429/153 |
| 7,226,694 | B2 * | 6/2007 | Asahina et al. | ............. | 429/160 |
| 7,618,736 | B2 * | 11/2009 | Shen et al. | .................... | 429/61 |

FOREIGN PATENT DOCUMENTS

| JP | 11-273631 | 10/1999 |
| JP | 2001-93503 | 4/2001 |
| JP | 2001-93508 | 4/2001 |

(Continued)

*Primary Examiner*—John S Maples
(74) *Attorney, Agent, or Firm*—Finnegan, Henderson, Farabow, Garrett & Dunner, LLP

(57) ABSTRACT

An object is to provide a sealed battery with reduced electric resistance from a power generation element to an external terminal of the battery and a method of manufacturing the same. A sealed battery 100 comprises a power generation element 120 including positive electrode plates 121 each having a positive electrode active material layer and negative electrode plates 123 each having a negative electrode active material layer, which are alternately arranged. The power generation element 120 is configured such that negative electrode lead portions 123r of the negative electrode plates 123 are provided extending in a predetermined direction. Further, the sealed battery 100 includes a battery case 110 housing the power generation element 120. This battery case 100 includes a negative-electrode case member 115 made of an electrically conductive material and serving as a negative collector plate to which the negative electrode lead portions 123r are connected.

18 Claims, 15 Drawing Sheets

FOREIGN PATENT DOCUMENTS

| | | |
|---|---|---|
| JP | 2001-297739 | 10/2001 |
| JP | 2002-304980 | 10/2002 |
| JP | 2002-343332 | 11/2002 |
| JP | 2003-039195 | 2/2003 |
| JP | 2003-77528 | 3/2003 |
| JP | 2003-317697 | 11/2003 |

* cited by examiner

SEALED BATTERY AND METHOD OF MANUFACTURING THE SEALED BATTERY

CROSS-REFERENCE TO RELATED APPLICATIONS

This application is a national phase application of International Application No. PCT/JP2005/016885, filed Sep. 7, 2005, and claims the priority of Japanese Application No. 2004-288268, filed Sep. 30, 2004, the content of both of which is incorporated herein by reference.

TECHNICAL FIELD

The present invention relates to a sealed battery having a power generation element which includes a positive electrode plate and a negative electrode plate and is housed in a battery case, and a method of manufacturing the sealed battery. In particular, the present invention relates to a sealed battery including, as a part of a battery case, a negative-electrode case member electrically connected to a negative electrode plate to form a negative electrode or a positive-electrode case member electrically connected to a positive electrode plate to form a positive electrode, and a method of manufacturing the sealed battery.

BACKGROUND ART

Heretofore, there have been many sealed batteries known for comprising a power generation element which includes positive and negative electrode plates and is housed in a battery case. For example, a few examples thereof are disclosed in Patent Documents 1 and 2.

In a battery of Patent Document 1, a negative electrode and a positive electrode are connected to current collector plates respectively. Each current collector plate is provided with a connecting projection which is fitted in a connecting hole perforated in a side wall of a battery case. Ends of the connecting projections of adjoining cells are welded to each other to connect the cells in series (see FIGS. 2 and 7 and a relevant explanation thereto in Patent Document 1).

In a battery of Patent Document 2, a negative electrode and a positive electrode are connected to current collector plates respectively. A connecting hole is perforated in a side wall of a battery case. A fitting is inserted in the connecting hole. The current collector plates of the adjoining cells are welded to each other through the fitting, connecting the cells in series (see FIGS. 2 and 8 and a relevant explanation thereto in Patent Document 2).

DISCLOSURE OF INVENTION

Problems to be Solved by the Invention

However, in the battery of Patent Document 1 that the ends of the connecting projections of the current collector plates fitted in the connecting holes of the battery case are welded to each other, a space has to be provided for a welding jig to be used for the welding. Hence, the connecting hole would have to be formed in an upper portion of the battery case in order to avoid interference with the power generation element housed in the battery case. This inevitably results in an increased distance of an electrically conducting path from the positive and negative electrodes to a welded portion, increasing electric resistance.

In the battery of Patent Document 2 that the current collector plates are welded to the fittings inserted in the connecting holes of the battery case, a space has to be provided for the welding jig to be used for the welding. In this case, similarly, the connecting hole would have to be formed in an upper portion of the battery case in order to avoid interference with the power generation element housed in the battery case. Therefore, this inevitably results in an increased distance of an electrically conducting path from the positive and negative electrodes to a welded portion, increasing electric resistance.

As above, the conventional sealed batteries are likely to include the long electrically conducting path from the power generation element to an external terminal of the battery and hence have a large electric resistance. Further, the battery case would have to be large in size considering the size of the power generation element to be housed. This causes a problem that output power limitations are imposed on the battery.

Means for Solving the Problems

The present invention has been made to solve the above problems and has a purpose to provide a sealed battery capable of having a small electric resistance between a power generation element and an external terminal of the battery and providing a large space for housing the power generation element, and a method of manufacturing the sealed battery.

To achieve the above purpose, a sealed battery comprising: a power generation element including a plurality of positive electrode plates each having a positive electrode active material layer and a plurality of negative electrode plates each having a negative electrode active material layer, the positive and negative electrode plates being alternately laminated so that a separator is interposed therebetween, each of the negative electrode plates including a negative electrode lead portion having no negative electrode active material layer and extending in a predetermined direction; and a battery case which houses the power generation element, wherein the battery case includes a negative-electrode case member that constitutes a part of the battery case, is made of an electrically conductive material to serve as a negative collector plate to which the negative electrode lead portions are connected, and a main case member that houses the power generation element and is sealed by the negative-electrode case member, the negative-electrode case member includes a flat plate part to which the negative electrode lead portions are connected, and side walls extending from peripheral edges of the plate part and perpendicular to the plate part, the side walls being in abutting contact with an open end of the main case member to seal it.

According to the present invention, the case member (the negative-electrode case member) serves as the negative collector plate and thus the negative electrode lead portions of the negative electrode plates are directly connected to the case member. Accordingly, the present invention does not need the negative collector plate that would be provided in a conventional sealed battery, so that a large space for housing the power generation element can be provided. Nonexistence of the negative collector plate makes it possible to shorten the electrically conducting path between the power generation element and the negative-electrode case member, resulting in a reduction in electric resistance thereof. Hence, the output power of the sealed battery can be increased. Because of nonexistence of the negative collector plate, further, the sealed battery can be manufactured at low cost.

Meanwhile, in the case where the battery case includes the main case member housing the power generation element and the negative-electrode case member sealing the main case member, the negative-electrode case member could be formed in a simple flat plate shape. However, if the negative electrode lead portions of the negative electrode plates are connected to such flat negative-electrode case member to allow the negative-electrode case member to serve as the negative collector plate, the heat stress developed during the connecting process will cause the negative-electrode case member to be deformed into corrugated or other shapes. There is therefore possible that the negative-electrode case member cannot seal the open end of the main case member.

In the present invention, on the other hand, the battery case includes the main case member housing the power generation element and the negative-electrode case member sealing the main case member. This negative-electrode case member has the flat plate part to which the negative electrode lead portion is connected, and besides, the side walls extending from the peripheral edges of this plate part to be perpendicular thereto. Accordingly, the negative-electrode case member can have increased strength and hence become resistant to deformation. This makes it possible to prevent or restrain the plate part and the side walls of the negative-electrode case member from becoming deformed when the negative electrode lead portions of the negative electrode plates are connected to the negative-electrode case member. Thus, the side walls of this negative-electrode case member can surely be brought into abutting contact with the open end of the main case member, thereby sealing it.

Alternatively, the means for solving the above problems may be configured a sealed battery comprising: a power generation element including a plurality of positive electrode plates each having a positive electrode active material layer and a plurality of negative electrode plates each having a negative electrode active material layer, the positive and negative electrode plates being alternately laminated so that a separator is interposed therebetween, each of the positive electrode plates including a positive electrode lead portion having no positive electrode active material layer and extending in a predetermined direction; and a battery case which houses the power generation element, wherein the battery case includes a positive-electrode case member that constitutes a part of the battery case, is made of an electrically conductive material to serve as a positive collector plate to which the positive electrode lead portions are connected, and a main case member that houses the power generation element and is sealed by the positive-electrode case member, the positive-electrode case member includes a flat plate part to which the positive electrode lead portions are connected, and side walls extending from peripheral edges of the plate part and perpendicular to the plate part, the side walls being in abutting contact with an open end of the main case member to seal it.

The sealed battery having the elements whose polarities are reversed from those of the above invention can also provide similar operations and effects to those of the above invention.

Herein, the "power generation element" has no particular restriction on design and others but has to include a plurality of positive electrode plates each having a positive electrode active material layer and a plurality of negative electrode plates each having a negative electrode active material layer, which are alternately laminated through separators interposed therebetween, and each negative (or positive) electrode lead portion of the negative (or positive) electrode plates with no negative (or positive) electrode active material layer is extended in a predetermined direction. Regarding the other electrode plate, i.e., the positive (or negative) electrode plates, generally, each positive (or negative) electrode lead portion with no positive (or negative) electrode active material layer is extended in the opposite direction to the negative (or positive) electrode lead portions.

The "battery case" has no particular restriction on design, material, and others, but must meet the above requirements. The shape thereof may be rectangular or cylindrical.

Further, the negative-electrode (or positive-electrode) case member has to be made of an electrically conductive material as above but the battery case excepting that member may be made of either an electrically conductive material or an insulating material. If metal is preferred for the battery case, an appropriate one may be selected in view of resistance to electrolyte (resistance to alkali), strength, electrical stabilization, and others. For example, available metal may include aluminum, aluminum alloy, nickel-plated carbon steel, austenitic stainless containing nickel in large quantity. If resin is preferred for the battery case, an appropriate one may be selected in view of resistance to electrolyte (resistance to alkali), strength, and others. For example, available resin may include polypropylene, polyethylene, polystyrene, polyphenylene ether, a copolymer of polyphenylene ether and polystyrene, ABS resin, acrylonitrile-styrene resin, polyamide, vinyl chloride resin, vinylidene chloride resin, methacrylic resin, and polymer blends or polymer alloys thereof.

Further, in the aforementioned sealed battery, the open end of the main case member and the side walls of the negative-electrode case member are connected to each other by a laser or electron beam, and a joint portion between the main case member and the negative-electrode case member is located within a region covering the negative electrode lead portions of the negative electrode plates in a direction perpendicular to the plate part.

When the main case member and the negative-electrode case member are to be welded by a laser or electron beam and if the negative electrode active material layer exists near the portion to be connected, the heat developed around this connected portion (joint portion) may cause deterioration of the negative electrode active material layer.

In the present invention, on the other hand, the main case member and the negative-electrode case member are connected by a laser or electron beam. This joint portion is located within a region covering the negative electrode lead portions of the negative electrode plates in the direction perpendicular to the plate part. Hence, even where the main case member and the negative-electrode case member are welded by the laser or electron beam, heat developed during the welding process may reach the negative electrode lead portion with no negative electrode active material layer but will not reach so much the negative electrode active material layer. It is therefore possible to prevent or restrain deterioration of the negative electrode active material layer during laser welding and others.

Alternately, in the aforementioned sealed battery, the open end of the main case member and the side walls of the positive-electrode case member are connected to each other by a laser or electron beam, and a joint portion between the main case member and the positive-electrode case member is located within a region covering the positive electrode lead portions of the positive electrode plates in a direction perpendicular to the plate part.

The sealed battery having the elements whose polarities are reversed from those of the above invention can also provide similar operations and effects to those of the above invention.

Furthermore, in any one of the aforementioned sealed batteries, each of the side walls of the negative-electrode case member includes a shielding protrusion located at an end of each side wall to protrude therefrom and inserted in the open end of the main case member.

According to this invention, the side walls of the negative-electrode case member have the shielding protrusions located at the ends of the side walls to protrude therefrom and be inserted in the open end of the main case member. Hence, during manufacture of this sealed battery, when the side walls of the negative-electrode case member are placed in abutting contact with the open end of the main case member, the shielding protrusions are inserted in the open end of the main case member. Accordingly, the shielding protrusions can serve to prevent irradiation of the laser or electron beam into the interior of the case even when the case is irradiated from outside by the laser or electron beam. Consequently, in connecting the cases, it is possible to prevent irradiation to the battery element in the case by the laser or electron beam, thereby preventing damage to the battery element such as deterioration of the negative electrode active material layer.

Alternatively, in any one of the aforementioned sealed batteries, each of the side walls of the positive-electrode case member includes a shielding protrusion located at an end of each side wall to protrude therefrom and inserted in the open end of the main case member.

The sealed battery having the elements whose polarities are reversed from those of the above invention can also provide similar operations and effects to those of the above invention.

Further, in any one of the sealed batteries, each of the positive electrode plates of the power generation element includes a positive electrode lead portion having no positive electrode active material layer and extending in a direction opposite the direction for the negative electrode lead portion, the sealed battery further comprises: a positive collector plate made of an electrically conductive material and to which the positive electrode lead portions are connected; and an external positive terminal electrically connected to the positive collector plate and fixed in the battery case so that a part of the external positive terminal is exposed to the outside of the case, at least one of the positive collector plate and the external positive terminal includes an elastic part which is elastically deformable for permitting variations in size of the battery element connected to the negative-electrode case member and the positive collector plate, in the extending directions of the positive electrode lead portions and the negative electrode lead portions.

As the aforementioned invention including no negative collector plate, the negative electrode lead portions of the power generation element are directly connected to the case member (the negative-electrode case member), the battery element connected to the negative-electrode case member and the positive collector plate is likely to vary in size. Such size variations may cause misalignment between the positive collector plate and the external positive terminal, which may make it difficult to connect the positive collector plate and the external positive terminal.

In the present invention, on the other hand, at least one of the positive collector plate and the external positive terminal is provided with the elastic portion which can be elastically deformed to permit the above size variation. Thus, the size variation even when caused is allowed by elastic deformation of the elastic portion. Accordingly, even where the positive collector plate and the external positive terminal become out of alignment, it is possible to reliably connect the positive collector plate and the external positive terminal. The reliability of the sealed battery can therefore be enhanced.

Alternatively, in any one of the aforementioned sealed batteries, each of the negative electrode plates of the power generation element includes a negative electrode lead portion having no negative electrode active material layer and extending in a direction opposite the direction for the positive electrode lead portion, the sealed battery further comprises: a negative collector plate made of an electrically conductive material and to which the negative electrode lead portions are connected; and an external negative terminal electrically connected to the negative collector plate and fixed in the battery case so that a part of the external negative terminal is exposed to the outside of the case, at least one of the negative collector plate and the external negative terminal includes an elastic part which is elastically deformable for permitting variations in size of the battery element connected to the positive-electrode case member and the negative collector plate, in the extending directions of the positive electrode lead portions and the negative electrode lead portions.

The sealed battery having the elements whose polarities are reversed from those of the above invention can also provide similar operations and effects to those of the above invention.

Another solving means is a method of manufacturing a sealed battery comprising: a power generation element including a plurality of positive electrode plates each having a positive electrode active material layer and a plurality of negative electrode plates each having a negative electrode active material layer, the positive and negative electrode plates being are alternately laminated so that a separator is interposed therebetween, each of the negative electrode plates including a negative electrode lead portion having no negative electrode active material layer and extending in a predetermined direction; and a battery case which houses the power generation element and includes a main case member housing the power generation element and a negative-electrode case member placed to seal the main case member and made of an electrically conductive material to serve as a negative collector plate to which the negative electrode lead portions are connected, and the negative-electrode case member including a flat plate part to which the negative electrode lead portions are connected, and side walls extending from peripheral edges of the plate part and perpendicular to the plate part, the side walls being in abutting contact with an open end of the main case member to seal it, wherein the method comprising the steps of: connecting the negative electrode lead portions of the power generation element to the plate part of the negative-electrode case member; and inserting the power generation element connected to the negative-electrode case member into the main case member and connecting the side walls of the negative-electrode case member to the main case member in abutting contact with the open end of the main case member to seal the main case member.

According to the present invention, the negative electrode lead portions of the power generation element are connected to the plate part of the negative-electrode case member. Then, of the connected power generation element and negative-electrode case member, the power generation element is inserted in the main case member, and the side walls of the negative-electrode case member are joined in abutting contact with the open end of the main case member, thereby sealing the main case member.

In the thus manufactured sealed battery, the negative-electrode case member serves as the negative collector plate. Accordingly, the present invention does not need the negative collector plate that would be provided in a conventional sealed battery, and hence a large space for housing the power generation element can be provided. Nonexistence of the negative collector plate makes it possible to shorten the electrically conducting path between the power generation element and the negative-electrode case member, resulting in a reduction in electric resistance thereof. Hence, the output power of the sealed battery can be increased. Because of the nonexistence of the negative collector plate, further, the sealed battery can be manufactured at low cost and the inexpensive sealed battery can be provided.

Further, the battery case includes the main case member housing the power generation element and the negative-electrode case member sealing it. This negative-electrode case member has the flat plate part to which the negative electrode lead portions are connected, and besides, the side walls extending from and perpendicular to the peripheral edge of this plate part. Accordingly, the negative-electrode case member can have increased strength to resist deformation. This makes it possible to prevent or restrain the plate part and the side walls of the negative-electrode case member from becoming deformed when the negative electrode lead portions of the negative electrode plate are connected to the negative-electrode case member. Thus, the side walls of the negative-electrode case member can surely be brought into abutting contact with the open end of the main case member, thereby sealing it.

Alternatively, another solving means is a method of manufacturing a sealed battery comprising: a power generation element including a plurality of positive electrode plates each having a positive electrode active material layer and a plurality of negative electrode plates each having a negative electrode active material layer, the positive and negative electrode plates being are alternately laminated so that a separator is interposed therebetween, each of the positive electrode plates including a positive electrode lead portion having no positive electrode active material layer and extending in a predetermined direction; and a battery case which houses the power generation element and includes a main case member housing the power generation element and a positive-electrode case member placed to seal the main case member and made of an electrically conductive material to serve as a positive collector plate to which the positive electrode lead portions are connected, and the positive-electrode case member including a flat plate part to which the positive electrode lead portions are connected, and side walls extending from peripheral edges of the plate part and perpendicular to the plate part, the side walls being in abutting contact with an open end of the main case member to seal it, wherein the method comprising the steps of: connecting the positive electrode lead portions of the power generation element to the plate part of the positive-electrode case member; and inserting the power generation element connected to the positive-electrode case member into the main case member and connecting the side walls of the positive-electrode case member to the main case member in abutting contact with the open end of the main case member to seal the main case member.

The sealed battery having the elements whose polarities are reversed from those of the above invention can also provide similar operations and effects to those of the above invention.

| EXPLANATION OF REFERENCE CODES | |
|---|---|
| 100, 200 | Sealed battery |
| 110, 210 | Battery case |
| 111 | Main case member |
| 111t | Open end (of main case member) |
| 112, 212 | Joint portion (of main case member and negative-electrode case member) |
| 115 | Negative-electrode case member |
| 115a | Plate part (of negative-electrode case member) |
| 115b, 115c, 115d, 115e | Side wall (of negative-electrode case member) |
| 115bt, 115ct, 115dt, 115et | Shielding protrusion (of side wall) |
| 120, 220 | Power generation element |
| 121, 221 | Positive electrode plate |
| 121s, 221s | Positive electrode active material layer |
| 121r, 221r | Positive electrode lead portion |
| 123, 223 | Negative electrode plate |
| 123s, 223s | Negative electrode active material layer |
| 123r, 223r | Negative electrode lead portion |
| 125, 225 | Separator |

-continued

EXPLANATION OF REFERENCE CODES

| | |
|---|---|
| 130 | Positive collector plate |
| 131 | Elastic piece |
| 140 | External positive terminal |
| 215 | Positive-electrode case member |
| 215a | Plate part (of positive-electrode case member) |
| 215b, 215c, 215d, 215e | Side wall (of positive-electrode case member) |
| 215bt, 215ct, 215dt, 215et | Shielding protrusion (of side wall) |
| 230 | Negative collector plate |
| 231 | Elastic piece |
| 240 | External negative terminal |

BEST MODE FOR CARRYING OUT THE INVENTION

First Embodiment

Figure 1:
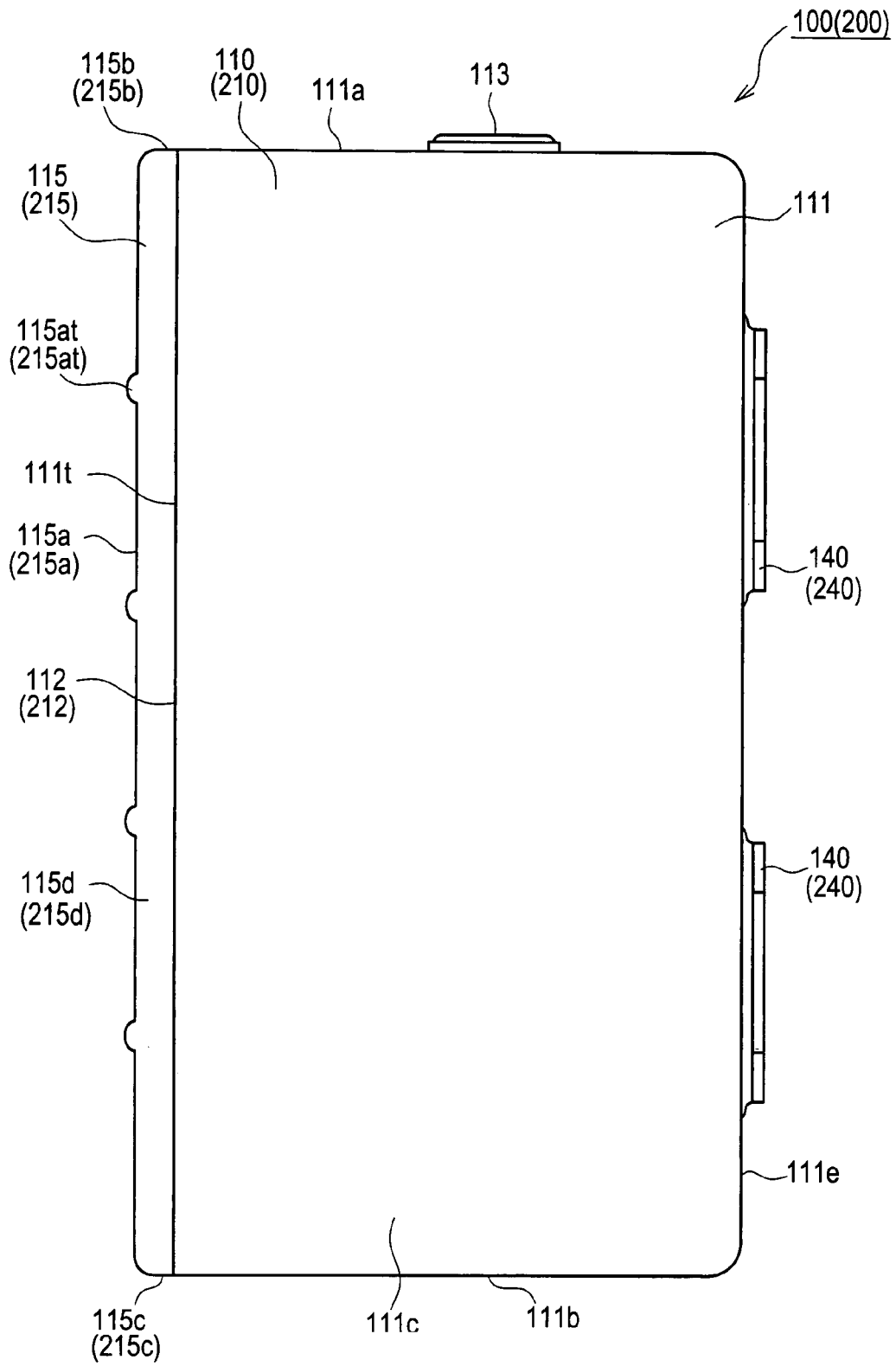
FIG. 1 is a side view of a sealed battery in first and second embodiments viewed from a first side wall side.
Figure 2:
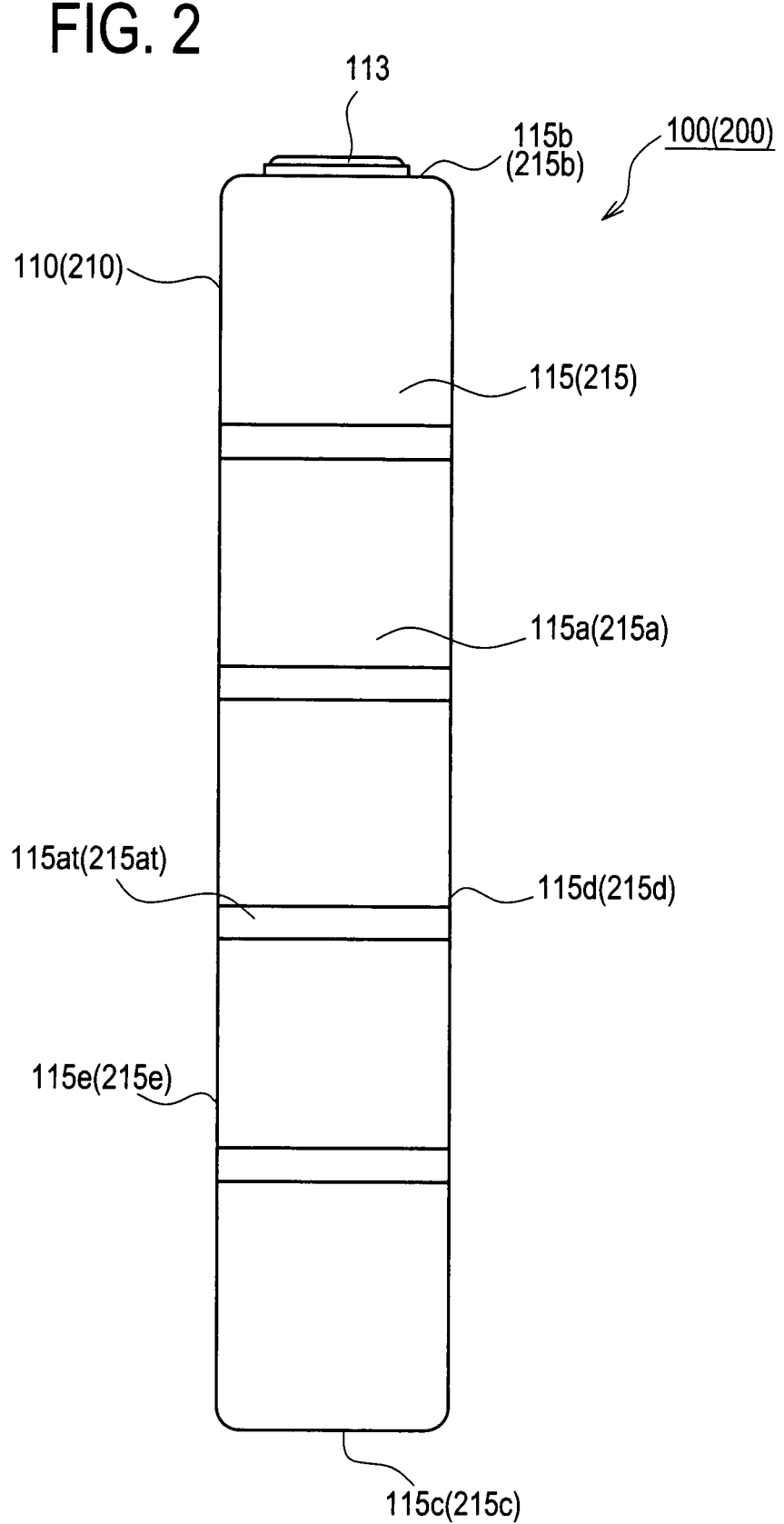
FIG. 2 is a side view of the sealed battery in the first and second embodiments viewed from a plate part side of a negative-electrode case member (or a positive-electrode case member)
Figure 3:
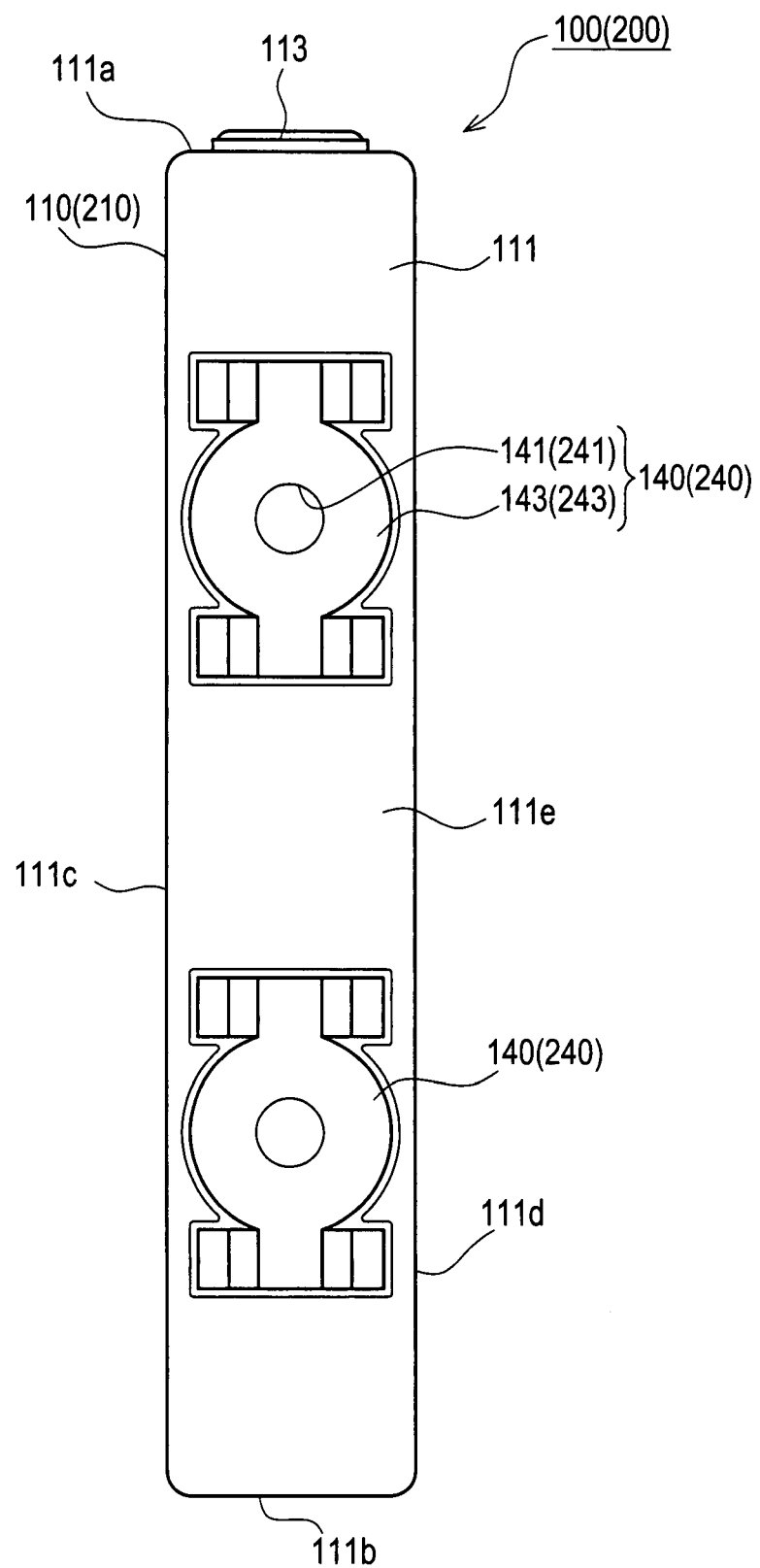
FIG. 3 is a side view of the sealed battery in the first and second embodiments viewed from a third side wall side.
Figure 4:
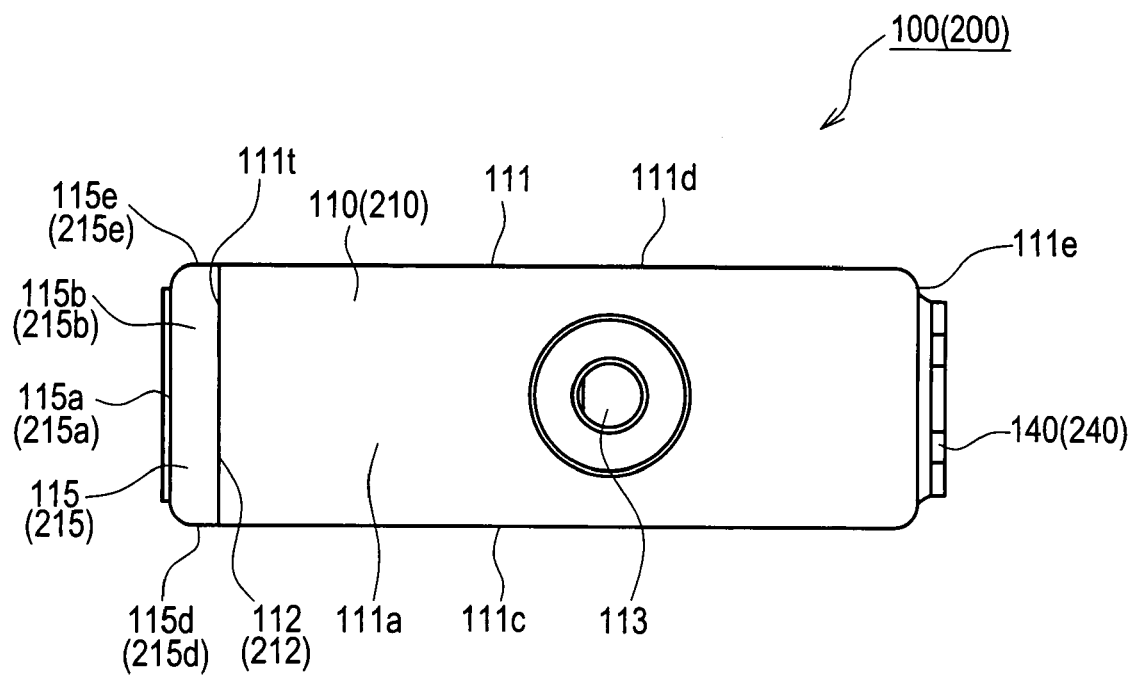
FIG. 4 is a plan view of the sealed battery in the first and second embodiments viewed from a top wall side.
Figure 5:
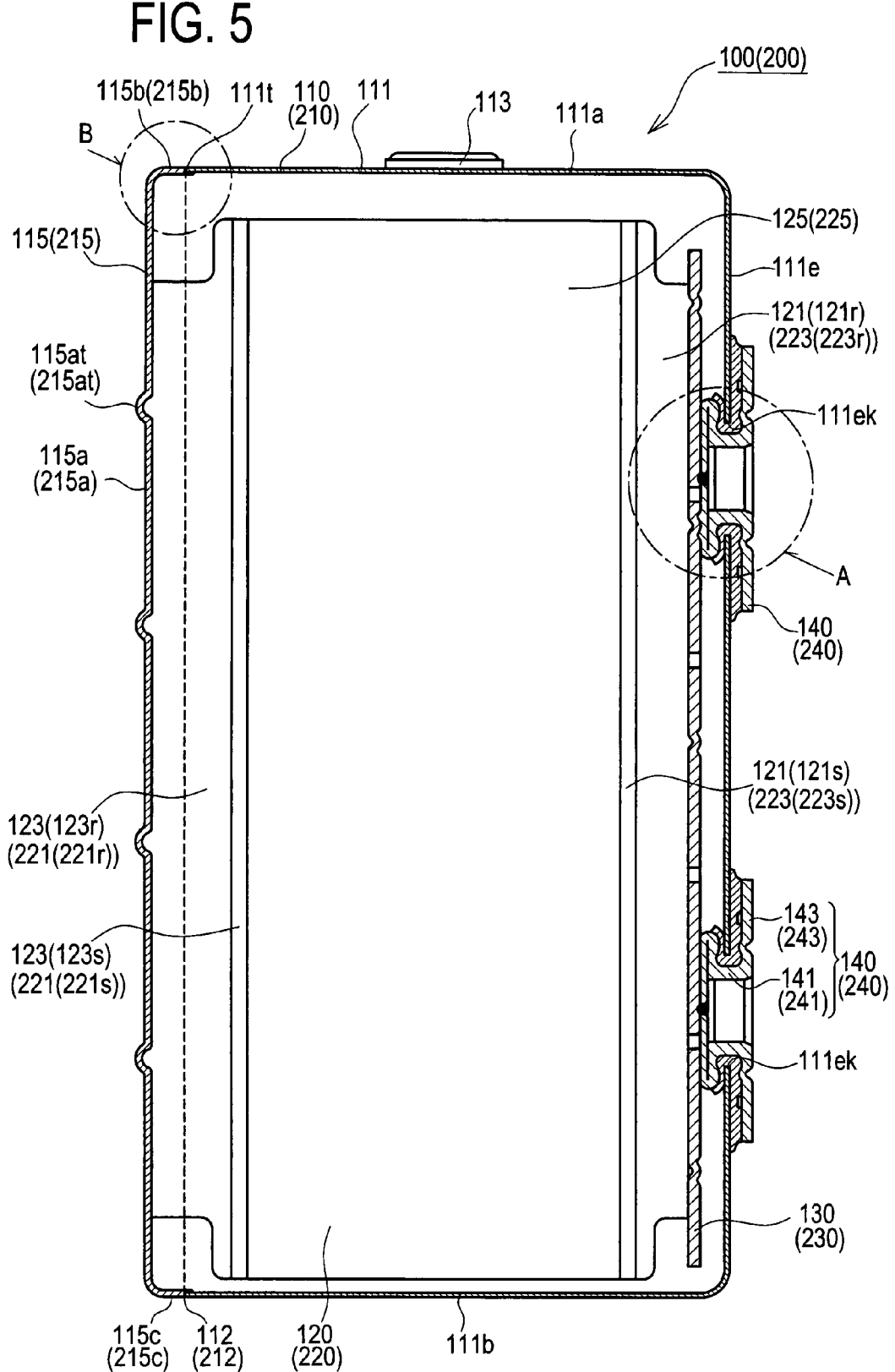
FIG. 5 is a cross sectional view of the sealed battery in the first and second embodiments.
Figure 6:
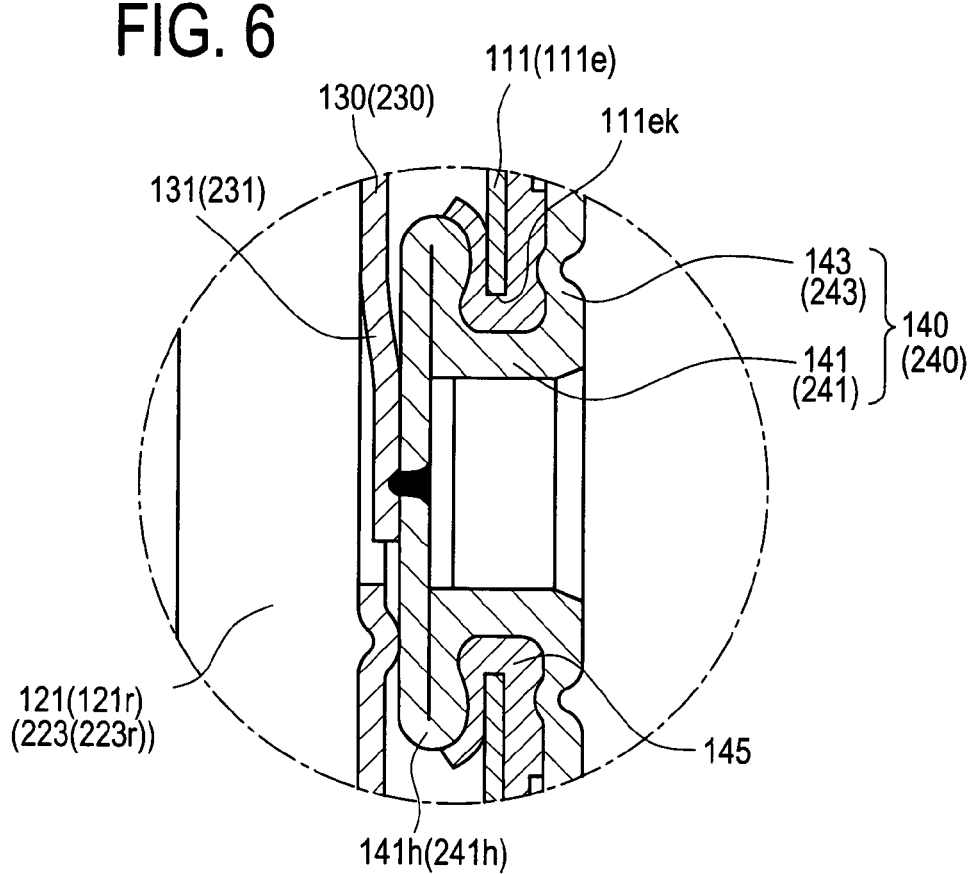
FIG. 6 is a partially enlarged sectional view of the sealed battery in the first and second embodiments, showing a part A in FIG. 5.
Figure 7:
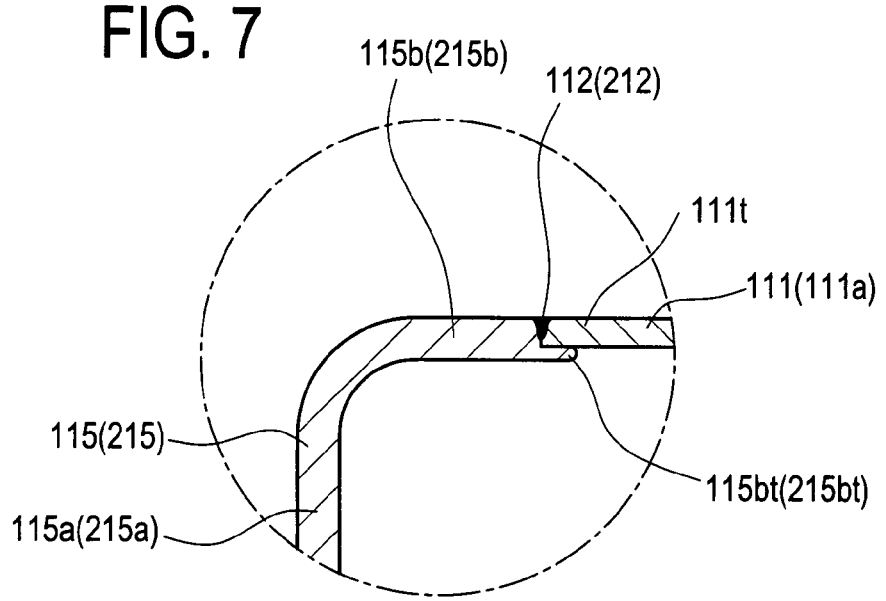
FIG. 7 is a partially enlarged sectional view of the sealed battery in the first and second embodiments, showing a part B in FIG. 5.

A detailed description of a preferred embodiment of the present invention will now be given referring to the accompanying drawings. FIG. 1 is a view of a sealed battery 100 in the first embodiment, viewed from a first side wall 111c side. FIG. 2 is a view of the sealed battery 100 viewed from a plate part 115a of a negative-electrode case member 115. Further, FIG. 3 is a view of the sealed battery 100 viewed from a third side wall 111e side. FIG. 4 is a view of the sealed battery 100 viewed from a top wall 111a side. FIG. 5 is a sectional view of the sealed battery 100. Further, FIG. 6 is a partially enlarged sectional view showing a part A in FIG. 5, and FIG. 7 is a partially enlarged sectional view showing a part B in FIG. 5.

This sealed battery 100 is a secondary battery such as a nickel-metal hydride storage battery and a lithium ion battery, which will be used as a power supply for electric vehicles and hybrid electric vehicles, and also is of a rectangular battery of a substantially rectangular parallelepiped shape. The sealed battery 100 includes a battery case 110 of a rectangular parallelepiped shape, a power generation element 120 housed in the battery case 110, a positive collector plate 130 fixedly provided in the battery case 110, external positive terminals 140 fixedly provided in the battery case 110, and others. The sealed battery 100 is filled with an electrolyte (see FIGS. 1 to 5). It is to be noted that this sealed battery 100 includes no conventional negative collector plate.

The battery case 110 comprises a main case member 111 made of an electrically conductive material (a nickel-plated steel plate) and having a deep closed-end rectangular shell shape, and a negative-electrode case member 115 similarly made of an electrically conductive material (a nickel-plated steel plate) and including side walls (first side wall 115b, second side wall 115c, third side wall 115d, and fourth side wall 115e) placed in abutting contact with an open end 111t of the main case member 111 to seal the same.

Figure 11:
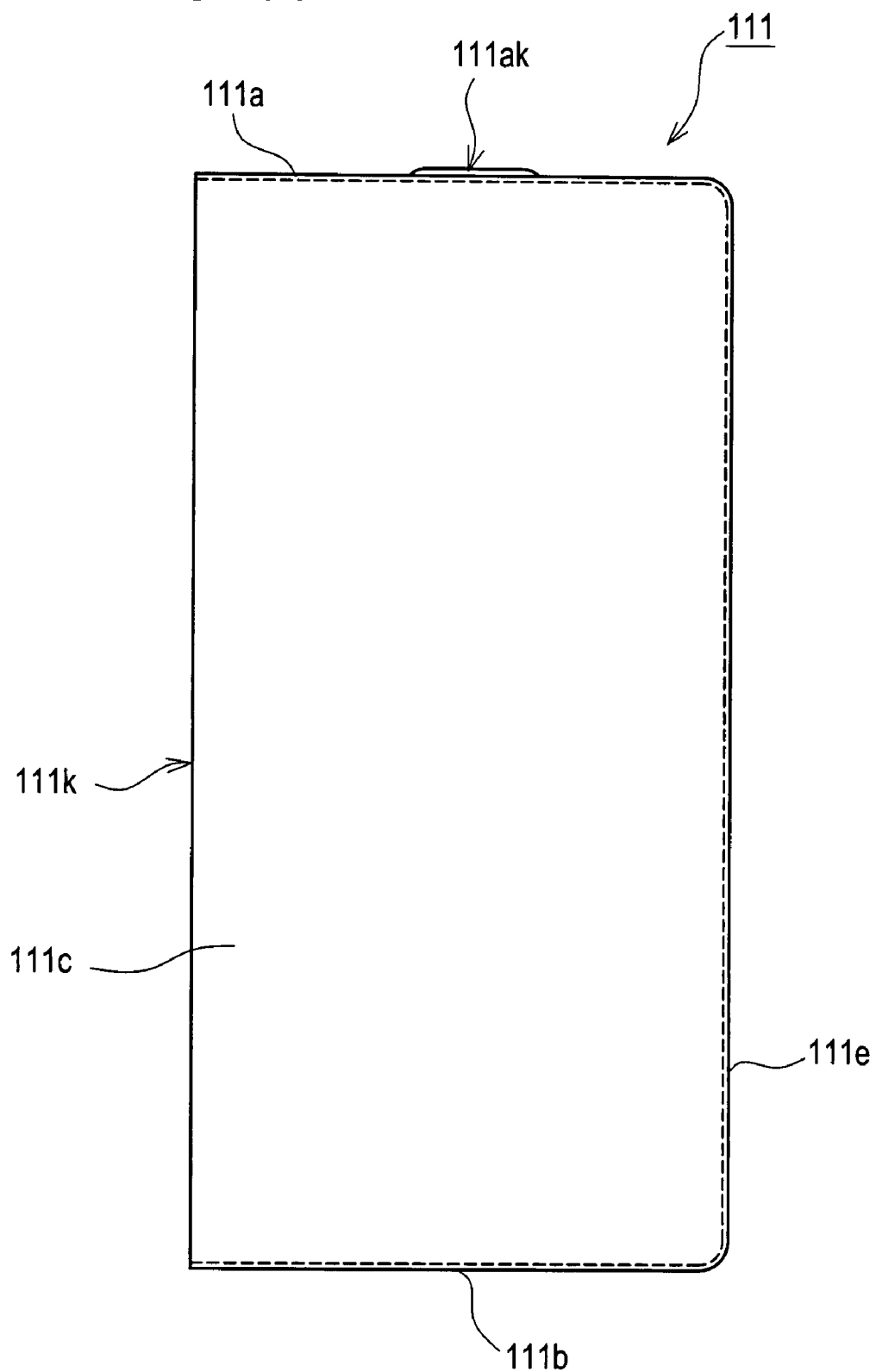
FIG. 11 is a side view of the main case member constituting the sealed battery in the first and second embodiments, viewed from the first side wall side.
Figure 12:
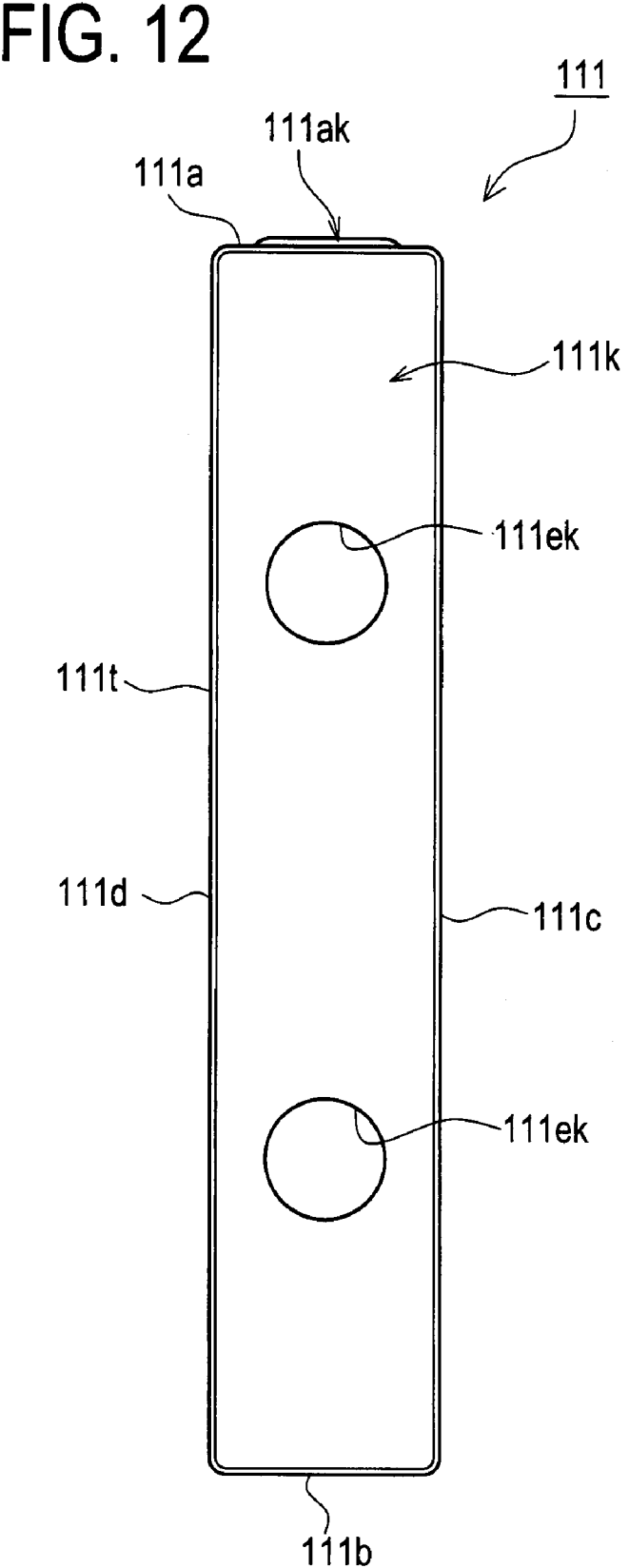
FIG. 12 is a side view of the main case member constituting the sealed battery in the first and second embodiments, viewed from an opening side.
Figure 13:
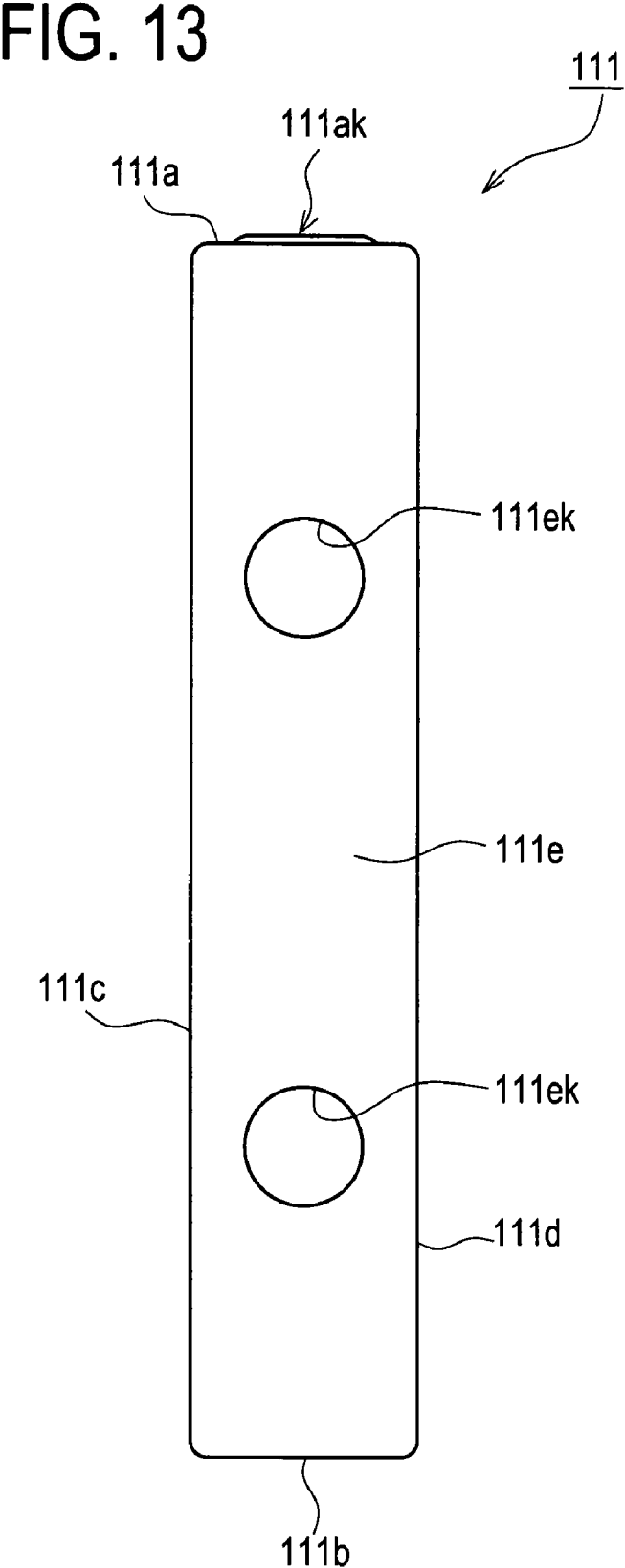
FIG. 13 is a side view of the main case member constituting the sealed battery in the first and second embodiments, viewed from a third side wall side.

Of them, the main case member 111 includes a top wall 111a of a flat rectangular shape, a bottom wall 111b parallel to and identical in shape to the top wall 111a, two flat side walls (first side wall 111c and second side wall 111d) each joining the long edge of the top wall 111a and the long edge of the bottom wall 111b, and a side wall (third side wall 111e) joining the short edge of the top wall 111a and the short edge of the bottom wall 111b, and a large opening 111k. FIG. 11 is a view of the main case member 111 shown by itself, viewed from the first side wall 111c side. FIG. 12 is a view of this main case member 111 viewed from the opening 111k side. Further, FIG. 13 is a view of this main case member 111 viewed from the third side wall 111e side. The top wall 111a is substantially centrally formed with a through hole 111ak in which a safety valve 113 is fixedly provided. The third side wall 111e is formed with two through holes spaced apart at a predetermined distance in a longitudinal direction, in each of which an external positive terminal 140 is fixedly provided as mentioned later.

Figure 8:
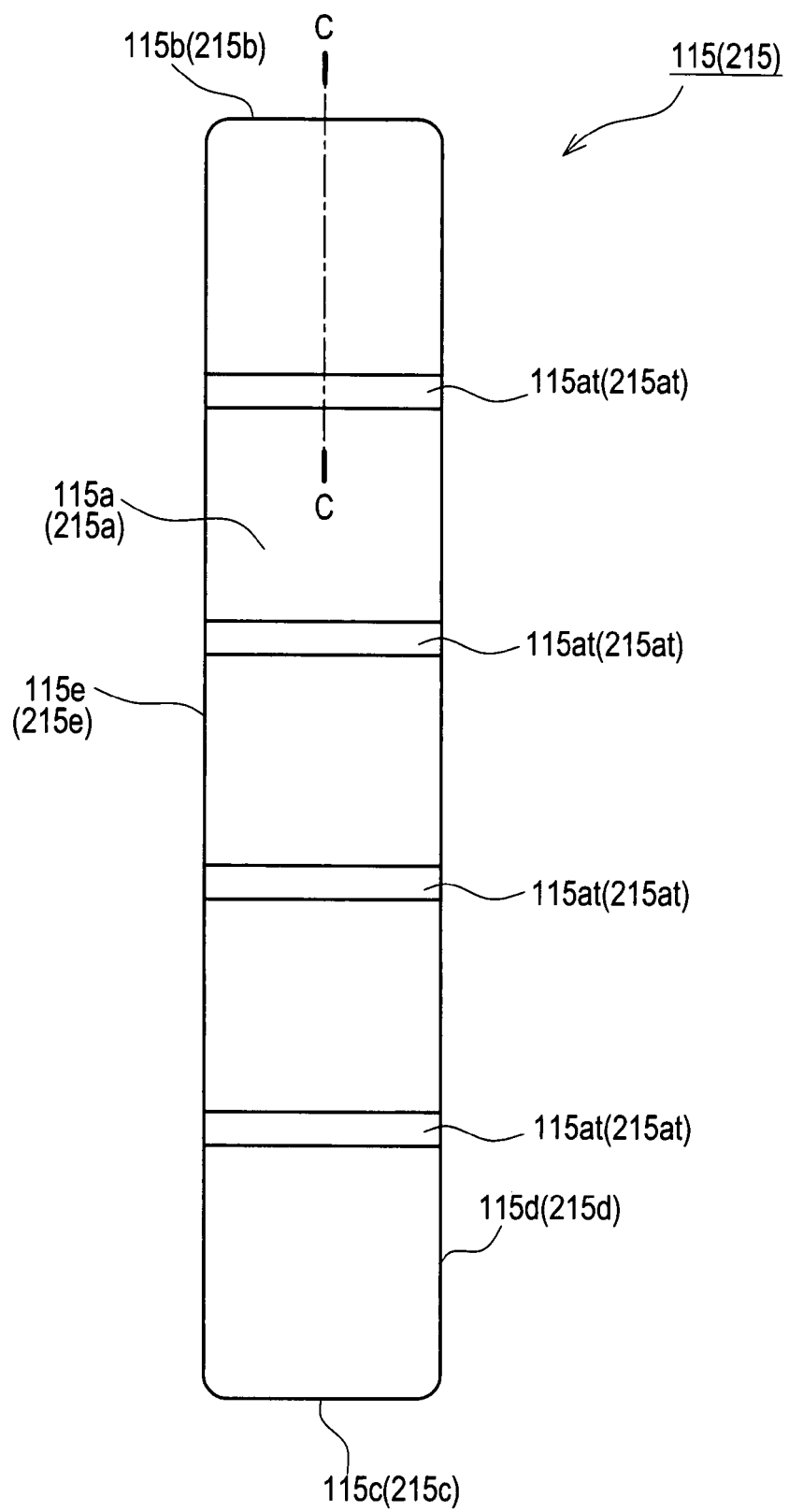
FIG. 8 is a side view of the negative-electrode case member (or the positive-electrode case member) constituting the sealed battery in the first and second embodiments, viewed from outside of the plate part.
Figure 9:
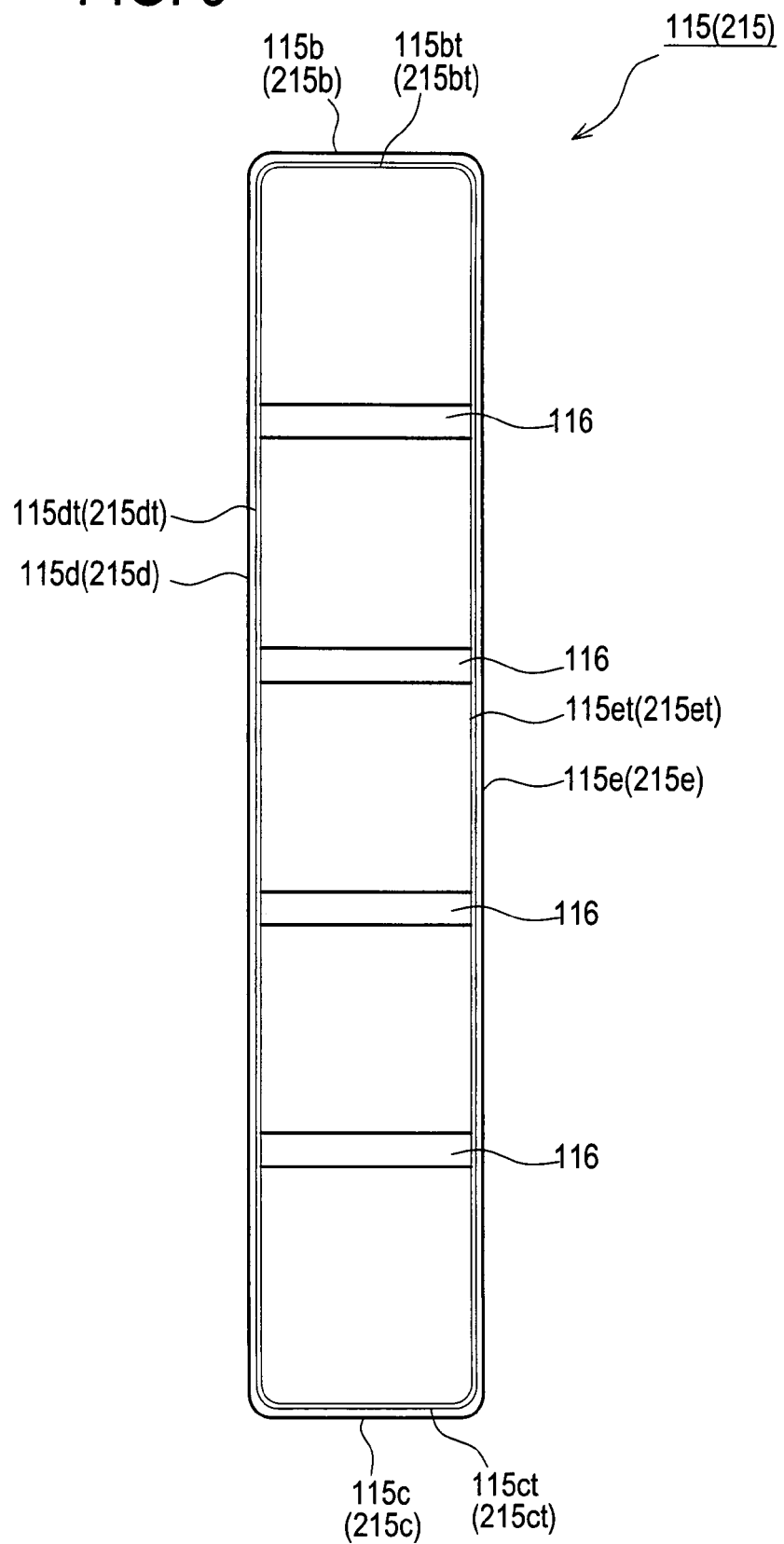
FIG. 9 is a side view of the negative-electrode case member (or the positive-electrode case member) constituting the sealed battery in the first and second embodiments, viewed from inside of the plate part.
Figure 10:
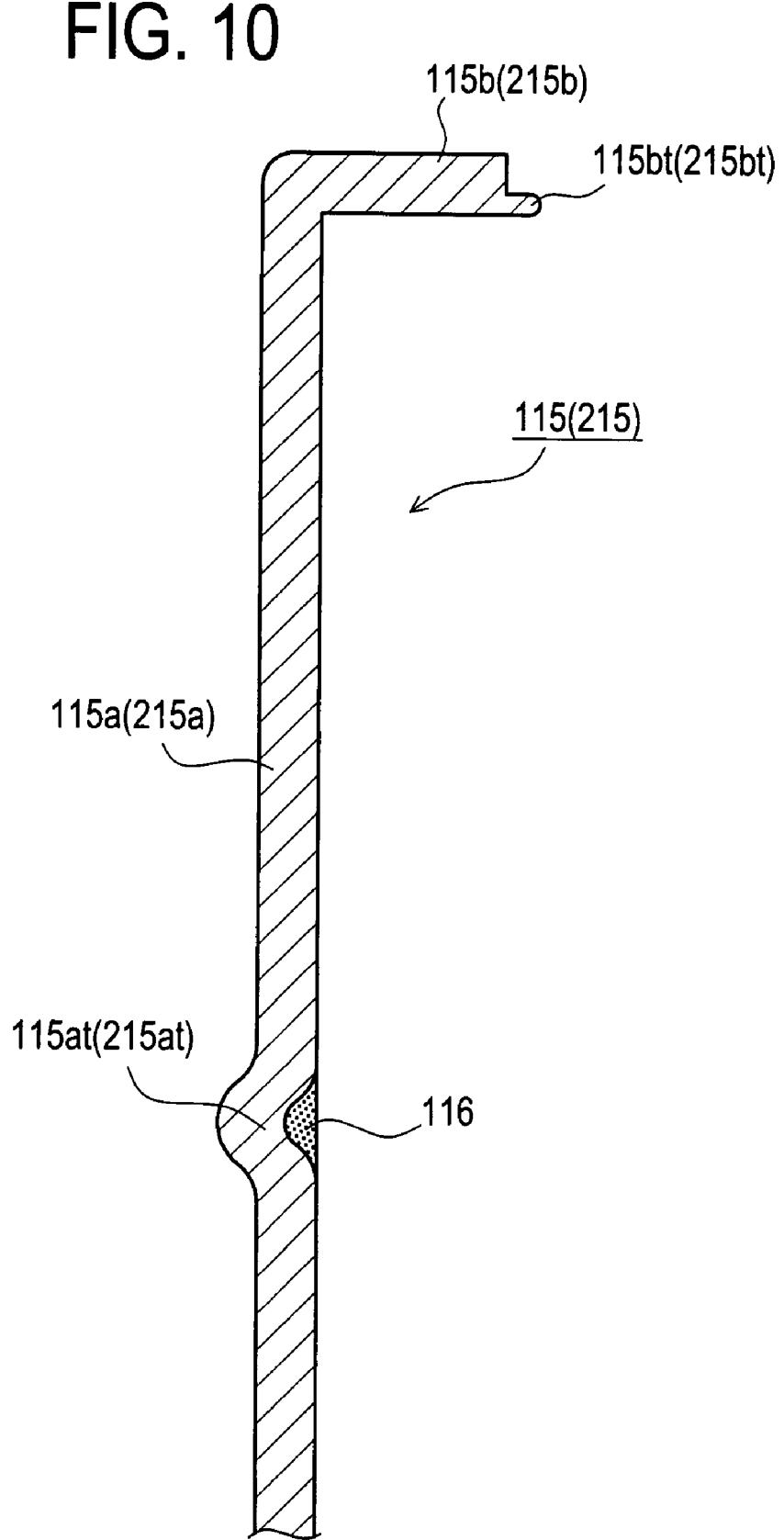
FIG. 10 is a sectional view of the negative-electrode case member (or the positive-electrode case member) constituting the sealed battery in the first and second embodiments, taken along a line C-C in FIG. 8.

The negative-electrode case member 115 includes a flat plate part 115a arranged parallel to the third side wall 111e of the main case member 111, and four side walls (first side wall 115b, second side wall 115c, third side wall 115d, and fourth side wall 115e) extending from the peripheral edges of this plate part 115a. FIG. 8 is a view of the negative-electrode case member 115 shown by itself, viewed from outside of the plate part 115a. FIG. 9 is a view of the negative-electrode case member 115 viewed from inside of the plate part 115a. Further, FIG. 10 is a sectional view taken along a line C-C in FIG. 8. As above, the negative-electrode case member 115 has the side walls 115b, 115c, 115d, and 115e, so that the negative-electrode case member 115 can have increased strength to resist deformation. Even when negative electrode lead portions 123r are connected to the negative-electrode case member 115, as mentioned later, it is therefore possible to prevent or restrain the plate part 115a and the side walls 115b, 115c, 115d, and 115e of the negative-electrode case member 115 from becoming deformed due to the heat developed during the connecting process.

The plate part 115a is formed with four ribs 115at protruding outside and extending in parallel with the short edge of the plate part 115a. Each rib 115at has an inside recess filled with a nickel brazing material 116.

Each of the side walls 115, 115c, 115d, and 115e is integrally formed with a shielding protrusion (first shielding protrusion 115bt, second shielding protrusion 115ct, third shielding protrusion 115dt, and fourth shielding protrusion 115et) protruding from the end of each side wall. Those shielding protrusions 115bt, 115ct, 115dt, 115et are inserted in the open end 111t of the main case member 111 when the side walls 115b, 115c, 115d, and 115e of the negative-electrode case member 115 are placed in abutting contact with the open end 111t. Even when a laser or electron beam is irradiated to the main case member 111 assembled with the negative-electrode case member 115 with the side walls 115b, 115c, 115d, and 115e placed in abutting contact with the open end 111t, such shielding protrusions 115bt, 115ct, 115dt, 115et can prevent the laser or electron beam from reaching the interior of the case. Thus, during the case connecting process, it is possible to prevent damage to the battery element 120 such as deterioration of negative electrode active material layers 123s which would be caused by irradiation of a laser or electron beam to the battery element 120 in the case.

The main case member 111 and the negative-electrode case member 115 are welded by laser welding while the side walls 115b, 115c, 115d, and 115e of the negative-electrode case member 115 are placed in abutting contact with the open end 111t of the main case member 111, forming a joint portion 112 extending throughout the periphery of the main case member 111. Thus, the main case member 111 is sealed. As mentioned above, the negative-electrode case member 115 is provided with the side walls 115b, 115c, 115d, and 115e to prevent or restrain deformation of the negative-electrode case member 115. Accordingly, the main case member 111 and the negative-electrode case member 115 can reliably be sealed in abutting contact relation. It is to be noted that the main case member 111 and the negative-electrode case member 115 may also be welded by an electron beam.

The joint portion 112 between the main case member 111 and the negative-electrode case member 115 is located at substantially the center, in a direction perpendicular to the plate part 115a (i.e. a lateral direction in the figure), of a region covering the negative electrode lead portions 123r of the negative electrode plates 123 of the power generation element 120 mentioned later. Since the joint portion 112 is located in the region covering the negative electrode lead portions 123r of the negative electrode plates 123, the heat developed during the welding process for welding the main case member 111 and the negative-electrode case member 115 may reach the negative electrode lead portions 123r applied with no negative electrode active material layer 123s but will not reach so much the negative electrode active material layers 123s. It is therefore possible to prevent or restrain deterioration of the negative electrode active material layers 123s during e.g. laser welding.

The power generation element 120 is constituted of a plurality of positive electrode plates 121 each having a positive electrode active material layer 121s and a plurality of negative electrode plates 123 each having a negative electrode active material layer 123s, which are alternately laminated so that a separator 125 is interposed therebetween (see FIG. 5). Of the negative electrode plates 123, each negative electrode lead portion 123r with no negative electrode active material layer 123s extends in a predetermined direction (leftwards in FIG. 5). Of the positive electrode plates 121, on the other hand, each positive electrode lead portion 121r with no positive electrode active material layer 121s extends in an opposite direction (rightwards in FIG. 5) to that of the negative electrode lead portion 123r.

The negative electrode lead portions 123r are directly connected to the plate part 115a of the negative-electrode case member 115 by an electron beam (see FIG. 5). To be concrete, the electron beam is irradiated to each rib 115at of the plate part 115a from outside, thereby connecting the plate part 115a and the negative electrode lead portions 123r through the nickel brazing material 116 filled in the inner recess of the rib 115at. Since the negative electrode lead portions 123r of the negative electrode plates 123 are directly connected to the negative-electrode case member 115, the negative-electrode case member 115 can serve as the negative collector plate. Therefore the negative collector plate that would be provided in the conventional sealed battery is no longer required, thus providing a large space for housing the power generation element 120. Further, nonexistence of the negative collector plate makes it possible to shorten the electrically conducting path between the power generation element 120 (the negative electrode plates 123) and the negative-electrode case member 115, resulting in a reduction in electric resistance thereof. The output power of the sealed battery 100 can therefore be increased. Because of no negative collector plate, the sealed battery 100 can be made compact and inexpensive.

All the positive electrode lead portions 121r are welded to the positive collector plate 130 mentioned later.

Figure 14:
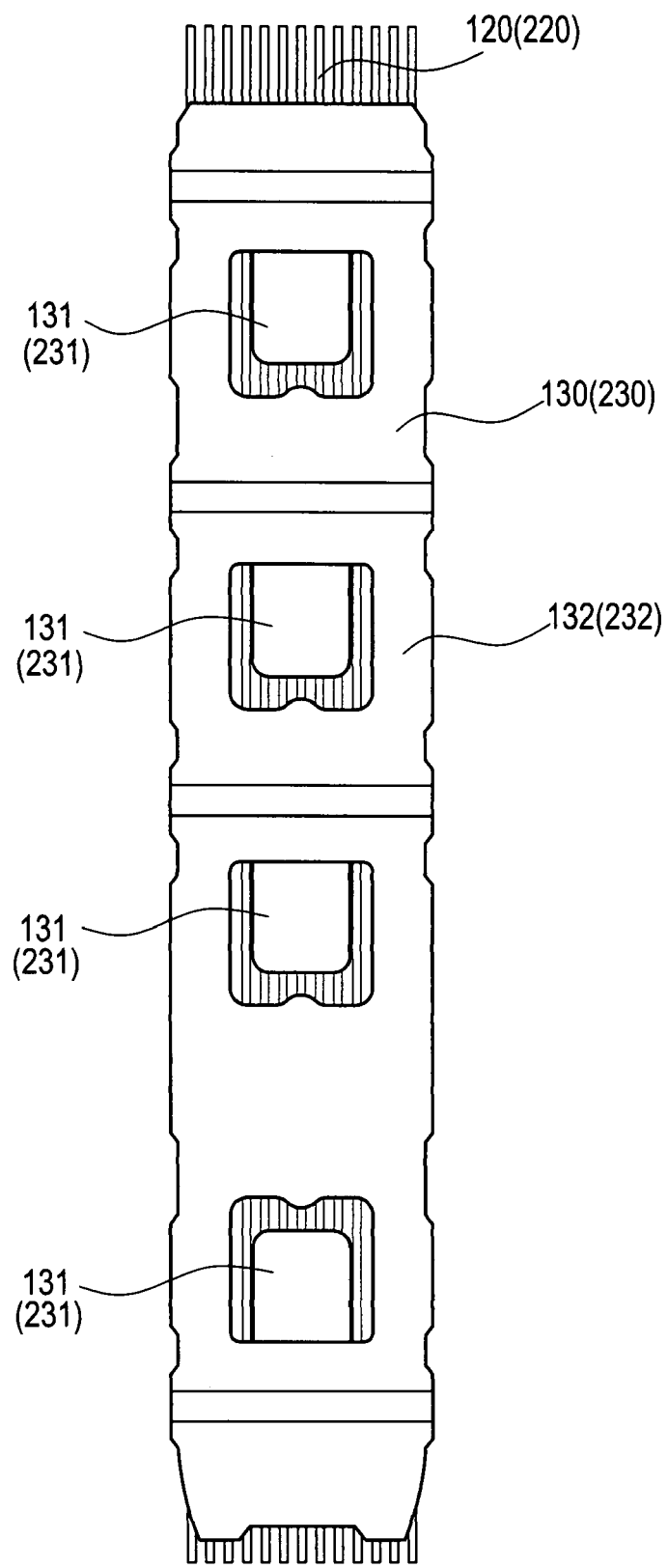
FIG. 14 is a side view of a connected structure of a positive collector plate (or a negative collector plate) and a power generation element in the sealed battery in the first and second embodiments, viewed from a positive collector plate side (or a negative collector plate side)
Figure 15:
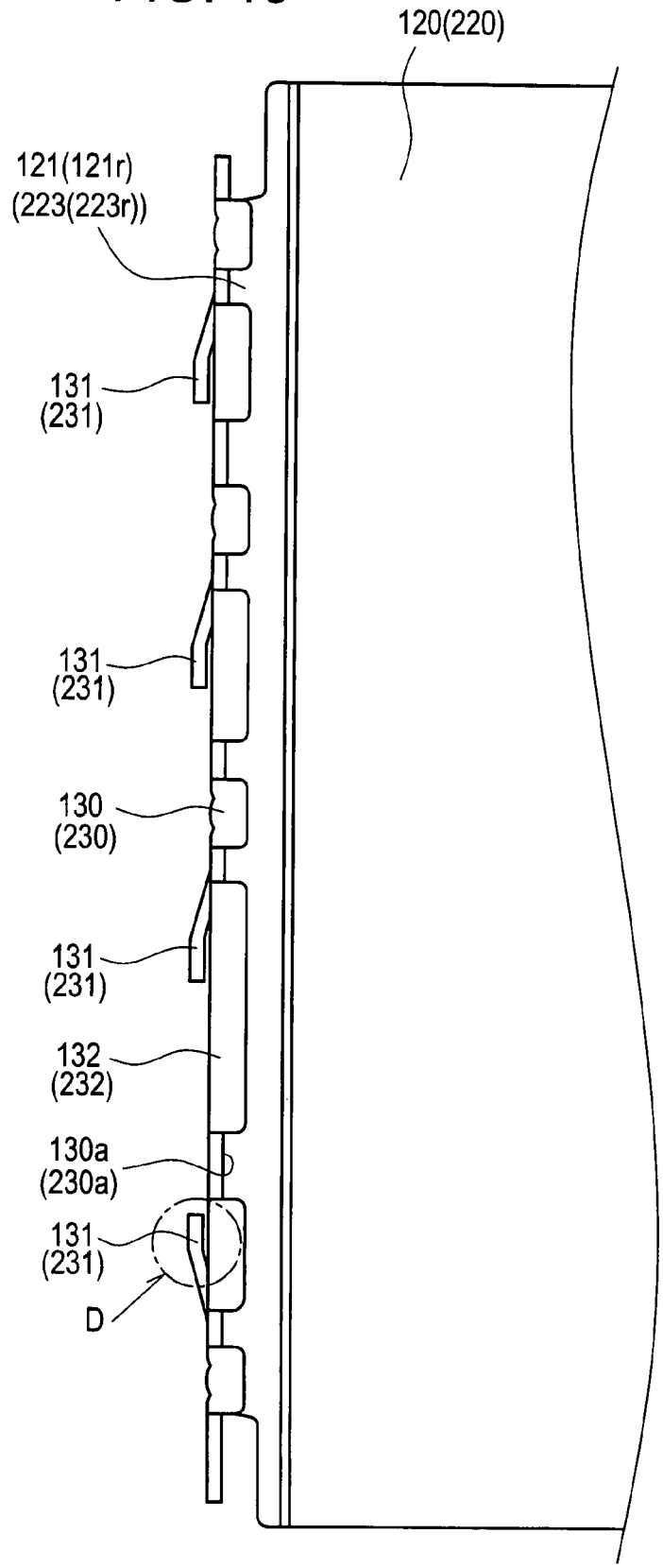
FIG. 15 is a side view of part of the connected structure of the positive collector plate (or the negative collector plate) and the power generation element in the sealed battery in the first and second embodiments, viewed from a power generation element side (a lateral side)
Figure 16:
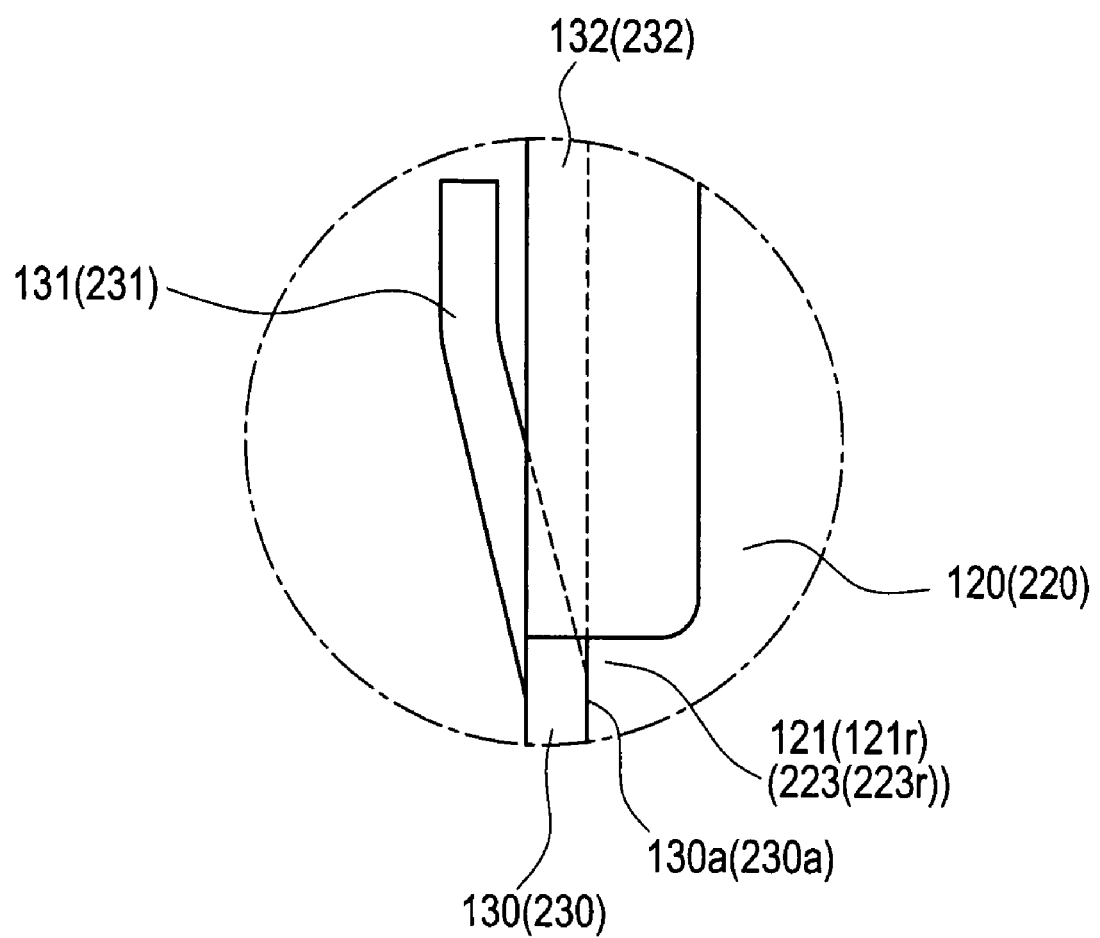
FIG. 16 is a partially enlarged view of the connected structure of the positive collector plate (or the negative collector plate) and the power generation element in the sealed batter in the first and second embodiments, showing a part D in FIG. 5.

The positive collector plate 130 is made of an electrically conductive material (a nickel plated steel plate). FIGS. 14 and 15 show the positive collector plate 130 connected to the power generation element 120. FIG. 16 is a partially enlarged view showing a part D in FIG. 15. The positive collector plate 130 is provided with a total of four elastic portions 131 in the positions where the external positive terminals 140 mentioned later are connected to the positive collector plate 130. Each elastic portion 131 is formed of a rectangular plate whose one edge is connected with a current collector main part 132. Each elastic portion 131 is turned at a joined portion with the current collector main part 132 to open to the outside (leftwards in FIGS. 15 and 16). This configuration allows the elastic portion 131 to be elastically moved toward the current collector main part 132 when the elastic portion 131 is pressed toward the current collector main part 132 (rightwards in FIGS. 15 and 16).

To an internal surface 130a of the positive collector plate 130, the positive electrode lead portions 121r of the positive electrode plates 121 of the power generation element 120 are electrically connected by welding. To the opposite side thereto, on the other hand, each elastic portion 131 is elastically moved toward the current collector main part 132 into contact with a compressed-deformed portion 141h of the external positive electrode terminal 141 mentioned later, and connected thereto by laser welding (see FIG. 6). The elastic portions 131 provided as above are elastically deformed to permit variations in size of the power generation element 120 when connected to the negative-electrode case member 115 and the positive collector plate 130. Accordingly, even when the positive collector plate 130 becomes out of alignment with the external positive terminals 140 mentioned later, the positive collector plate 130 and the external positive terminals 140 can be connected to each other more reliably. This makes it possible to enhance the reliability of the sealed battery 100.

As shown in FIGS. 5 and 6, each external positive terminal 140 is constituted of a hollow cylindrical part 141 closed at one end (a left end in FIGS. 5 and 6) and a flange 143 radially outwardly extending from the other end (a right end in FIGS. 5 and 6) of the cylindrical part 141. The cylindrical part 141 is fitted in a through hole 111ek of the battery case 110 (the main case member 111) so that an electrical insulating seal member 145 is interposed between the battery case 110 and the cylindrical part 141 and the left end of the cylindrical part 141 in FIGS. 5 and 6 is located inside the battery while the right end in FIGS. 5 and 6 is located outside the battery. Of the cylindrical part 141, the left end forms the compressed-deformed portion 141h radially outwardly expanded, which compresses the seal member 145 partly interposed between the internal surface of the third side wall 111e and the compressed-deformed portion 141h. The flange 143 compresses the seal member 145 partly interposed between the external surface of the third side wall 111e of the main battery case 111 and the flange 143. Such a configuration ensures insulation between each external positive terminal 140 and the main case member 111 and also airtightness of the battery case 110. Further, the compressed-deformed portion 141h of the cylindrical part 141 is fixed by laser welding to the positive collector plate 130 as mentioned above.

The aforementioned sealed battery 100 is manufactured in the following manner. Specifically, the power generation element 120 is fabricated by a well known technique. Further, the negative-electrode case member 115 filled with the nickel brazing material 116 in the recesses of the ribs 115at is made. The negative electrode lead portions 123r of the power generation element 120 are brought into contact with the internal surface of the plate part 115a of the negative-electrode case member 115, and then an electron beam is irradiated to each rib 115at from outside of the plate part 115a to melt the nickel brazing material 116, thereby connecting the negative electrode lead portions 123r to the internal surface of the plate part 115a. Furthermore, the positive electrode lead portions 121r of the power generation element 120 are connected to the current collector main part 132 of the positive collector plate 130 by a well known technique.

On the other hand, each external positive terminal 140 is fixed to the main case member 111. Specifically, the seal member 145 is set in the through hole 111ek of the main case member 111 and then the external positive terminal 140 is inserted therein from outside. Under fluid pressure applied to the inside of the cylindrical part 141, one end of the cylindrical part 141 is axially pressed from inside of the case, thus radially outwardly expanding and further axially becoming compressed and deformed, forming the compressed-deformed portion 141h. In this way, the seal member 145 is compressed between the flange 143 and the compressed-deformed portion 141h through the main case member 111. This makes it possible to ensure airtightness, and the external positive terminal 140 is fixed to the main case member 111.

Of the connected structure constituted of the power generation element 120 and the negative-electrode case member 115 and the positive collector plate 130, the positive collector plate 130 and the power generation element 120 are inserted in the main case member 111 until the side walls 115b, 115c, 115d, and 115e of the negative-electrode case member 115 are brought into contact with the open end 111t of the main case member 111. A laser beam is then irradiated from outside to the negative-electrode case member 115 and the main case member 111 to join them, thereby sealing the main case member 111.

Subsequently, a laser beam is irradiated to a recess of the cylindrical part 141 from outside of the external positive terminal 140 to connect the compressed-deformed portion 141h of the cylindrical part 141 to the elastic portion 131 of the positive collector plate 130.

The electrolyte is then filled through the through hole (inlet) 111ak of the main case member 111. The safety valve 113 is attached to close the inlet 111ak. The sealed battery 100 is thus completed.

In the sealed battery 100 manufactured in the above manner, the negative-electrode case member 115 serves as the negative collector plate as mentioned above, so that there is no negative collector plate provided in the conventional sealed battery. This makes it possible to ensure a large space for housing the power generation element 120. Because of no negative collector plate, the electrically conducting path between the power generation element 120 (the negative electrode plates 123) and the negative-electrode case member 115 can be shortened, resulting in a reduction in electric resistance thereof. Hence, the available output power of the sealed battery 100 can be increased. Because of no negative collector plate, further, the sealed battery 100 can be manufactured at low cost. Thus, the inexpensive sealed battery can be provided.

Second Embodiment

Next, a second embodiment will be explained. It is to be noted that the explanations of parts identical to those in the first embodiment are omitted or simplified. A sealed battery 200 in the second embodiment differs in a configuration having no positive collector plate instead of the negative collector plate from the sealed battery 100 in the first embodiment with no negative collector plate.

The sealed battery 200 in the second embodiment similarly includes a battery case 210 and a power generation element 220 housed in the battery case 210. Inside the battery case 210, on the other hand, a positive collector plate 230 is fixedly provided instead of the negative collector plate 130 in the first embodiment. In the battery case 210, external negative terminals 240 are fixedly provided instead of the external positive terminal 140 in the first embodiment.

The main case member 111 of the battery case 210 is identical to that in the first embodiment. On the other hand, a member which seals this main case member 111 is a positive-electrode case member 215, not a negative-electrode case member. This positive-electrode case member 215 is identical in configuration to the negative-electrode case member 115 in the first embodiment, that is, it includes a plate part 215a and four side walls 215b, 215c, 215d, and 215e. The plate part 215a is formed with four ribs 215 at each having an inner recess filled with a nickel brazing material 116. The side walls 215b, 215c, 215d, and 215e are provided with shielding protrusions 215bt, 215ct, 215dt, and 215et respectively.

Such positive-electrode case member 215, as with the negative-electrode case member 115 in the first embodiment, includes the side walls 215b, 215c, 215d, and 215e to have increased strength and resist deformation. Even when positive electrode lead portions 221r of positive electrode plates 221 are connected to the positive-electrode case member 215, as mentioned later, it is possible to prevent or restrain the positive-electrode case member 215 from becoming deformed due to the heat developed during the connecting process.

The positive-electrode case member 215 also includes the shielding protrusions 215bt, 215ct, 215dt, and 215et. Even when the side walls 215b, 215c, 215d, and 215e of the positive-electrode case member 215 are brought into abutting contact with the open end of the main case member 111 and then subjected to irradiation of a laser or electron beam from outside, as mentioned later, it is accordingly possible to prevent irradiation of the laser or electron beam to the interior of the case. Thus, it is possible to prevent damage to the battery element 220 such as deterioration of positive electrode active material layers 221s which would be caused by irradiation of a laser beam and so on to the battery element 220 in the case during the connecting process of the case.

The main case member 111 and the positive-electrode case member 215 are welded by laser welding in the same manner as in the first embodiment while the side walls 215b, 215c, 215d, and 215e of the positive-electrode case member 215 are placed in abutting contact with the open end 111t of the main case member 111, forming a joint portion 212 extending throughout the periphery of the main case member 111. As shown by a dotted line in FIG. 5, this joint portion 212 is located at substantially the center, in a direction perpendicular to the plate part 215a (i.e. a lateral direction in the figure), of a region covering the positive electrode lead portion 221r of the positive electrode plate 221 of the power generation element 220 mentioned later. Thus, the heat developed during the welding process for welding the main case member 111 and the positive-electrode case member 215 by a laser or electron beam may reach the positive electrode lead portion 221r with no positive electrode active material layer 221s but will not reach so much the positive electrode active material layers 221s. It is therefore possible to prevent or restrain deterioration of the positive electrode active material layers 221s during e.g. laser welding.

The power generation element 220 is configured as in the first embodiment but is housed in the battery case 210 in a reverse orientation to that in the aforementioned first embodiment (e.g. in left-right reverse in FIG. 5).

The positive electrode lead portions 221r of the power generation element 220 are directly connected to the plate part 215a of the positive-electrode case member 215 by electron beam welding (see FIG. 5). Since the positive electrode lead portions 221r of the positive electrode plate 221 are directly connected to the positive-electrode case member 215, the positive-electrode case member 215 can serve as the positive collector plate. The positive collector plate is therefore no longer required, so that a large space can be provided for housing the power generation element 220. Further, it is possible to shorten the electrically conducting path between the power generation element 220 (the positive electrode plates 221) and the positive-electrode case member 215, resulting in a reduction in electric resistance thereof. Thus, the output of the sealed battery 200 can be increased. Because of no positive collector plate, the sealed battery 200 can be made compact and inexpensive.

The negative collector plate 230 is of the same configuration as the positive collector plate 130 in the aforementioned first embodiment (see FIGS. 14 to 16). Specifically, the negative collector plate 230 includes a current collector main part 232 and four elastic portions 231. To an internal surface 230a of the negative collector plate 230, each of the negative electrode lead portions 223r of the negative electrode plates 223 of the power generation element 220 is electrically connected by welding. To the other side, the elastic portions 231 are elastically moved toward the current collector main part 232 into contact with compressed-deformed portions 241h of the external negative terminals 241 mentioned later, and connected thereto by laser welding (see FIG. 6). These elastic portions 231 provided as above are elastically deformed to permit variations in size of the power generation element 220 when connected to the positive-electrode case member 215 and the negative collector plate 230. Accordingly, even when the negative collector plate 230 becomes out of alignment with the external negative terminals 240, the negative collector plate 230 and the external negative terminals 240 can be connected to each other more reliably.

It is to be noted that this sealed battery 200 may be manufactured in a substantially same manner as for the sealed battery 100 in the first embodiment. Specifically, the positive electrode lead portions 221r of the power generation element 220 are brought into contact with the internal surface of the plate part 215a of the positive-electrode case member 215 and then an electron beam is irradiated to the rib 215at of the plate part 215a from outside, thereby connecting them. Further, the negative electrode lead portions 223r of the power generation element 220 are connected to the current collector main part 232 of negative collector plate 230. On the other hand, the external negative terminals 240 are fixed to the main case member 111.

Of the connected structure constituted of the power generation element 220 and the positive-electrode case member 215 and the negative collector plate 230, thereafter, the negative collector plate 230 and the power generation element 220 are inserted in the main case member 111 until the side walls 215b, 215c, 215d, and 215e of the positive-electrode case member 215 are brought into contact with the open end 111t of the main case member 111. A laser beam is then irradiated from outside to connect the positive-electrode case member 215 and the main case member 111, sealing the main case member 111.

The external negative terminals 240 and the negative collector plate 230 are successively connected. The electrolyte is then filled in and the safety valve 113 is attached, completing the aforementioned sealed battery 200. In the second embodiment, as above, the sealed battery 200 can be manufactured at low cost because of nonexistence of the positive collector plate. This makes it possible to provide a compact, inexpensive sealed battery.

The present invention has been explained referring to the preferred embodiments but not limited thereto, and may be embodied in other specific forms without departing from the spirit or essential characteristics thereof.

For instance, in the first and second embodiments, the positive collector plate 130 (or the negative collector plate 230) is provided with the elastic portions 131 (231) to permit size variations of the power generation element 120 (220). Alternatively, the external positive terminals 140 (or the external negative terminals 240) may be provided with elastic portions to absorb size variations of the power generation element 120 (220). As another alternative, further, both the positive collector plate 130 (or the negative collector plate 230) and the external positive terminals 140 (or the external negative terminals 240) may be provided with elastic portions to absorb size variations of the power generation element 120 (220).

INDUSTRIAL APPLICABILITY

As clearly described above, according to the present invention, it is possible to provide the sealed battery with reduced electric resistance from the power generation element to the external terminals of the battery and also having a large space for housing the power generation element, and a method of manufacturing the same.

The invention claimed is:

1. A sealed battery comprising:
    a power generation element including a plurality of positive electrode plates each having a positive electrode active material layer and a plurality of negative electrode plates each having a negative electrode active material layer, the positive and negative electrode plates being alternately laminated so that a separator is interposed therebetween, each of the negative electrode plates including a negative electrode lead portion having no negative electrode active material layer and extending in a predetermined direction; and
    a battery case which houses the power generation element,
    wherein the battery case includes
    a negative-electrode case member that constitutes a part of the battery case, is made of an electrically conductive material to serve as a negative collector plate to which the negative electrode lead portions are connected, and
    a main case member that houses the power generation element and is sealed by the negative-electrode case member,
    the negative-electrode case member includes
    a flat plate part to which the negative electrode lead portions are connected, and
    side walls extending from peripheral edges of the plate part and perpendicular to the plate part,
    the side walls being in abutting contact with an open end of the main case member to seal it.

2. The sealed battery according to claim 1, wherein
    the open end of the main case member and the side walls of the negative-electrode case member are connected to each other by a laser or electron beam, and
    a joint portion between the main case member and the negative-electrode case member is located within a region covering the negative electrode lead portions of the negative electrode plates in a direction perpendicular to the plate part.

3. The sealed battery according to claim 1, wherein
    each of the side walls of the negative-electrode case member includes a shielding protrusion located at an end of each side wall to protrude therefrom and inserted in the open end of the main case member.

4. The sealed battery according to claim 1, wherein
    each of the positive electrode plates of the power generation element includes a positive electrode lead portion having no positive electrode active material layer and extending in a direction opposite the direction for the negative electrode lead portion, the sealed battery further comprises:

a positive collector plate made of an electrically conductive material and to which the positive electrode lead portions are connected; and an external positive terminal electrically connected to the positive collector plate and fixed in the battery case so that a part of the external positive terminal is exposed to the outside of the case, at least one of the positive collector plate and the external positive terminal includes an elastic part which is elastically deformable for permitting variations in size of the battery element connected to the negative-electrode case member and the positive collector plate, in the extending directions of the positive electrode lead portions and the negative electrode lead portions.

5. The sealed battery according to claim 2, wherein each of the side walls of the negative-electrode case member includes a shielding protrusion located at an end of each side wall to protrude therefrom and inserted in the open end of the main case member.

6. The sealed battery according to claim 2, wherein each of the positive electrode plates of the power generation element includes a positive electrode lead portion having no positive electrode active material layer and extending in a direction opposite the direction for the negative electrode lead portion, the sealed battery further comprises:

a positive collector plate made of an electrically conductive material and to which the positive electrode lead portions are connected; and an external positive terminal electrically connected to the positive collector plate and fixed in the battery case so that a part of the external positive terminal is exposed to the outside of the case, at least one of the positive collector plate and the external positive terminal includes an elastic part which is elastically deformable for permitting variations in size of the battery element connected to the negative-electrode case member and the positive collector plate, in the extending directions of the positive electrode lead portions and the negative electrode lead portions.

7. The sealed battery according to claim 3, wherein each of the positive electrode plates of the power generation element includes a positive electrode lead portion having no positive electrode active material layer and extending in a direction opposite the direction for the negative electrode lead portion, the sealed battery further comprises:

a positive collector plate made of an electrically conductive material and to which the positive electrode lead portions are connected; and an external positive terminal electrically connected to the positive collector plate and fixed in the battery case so that a part of the external positive terminal is exposed to the outside of the case, at least one of the positive collector plate and the external positive terminal includes an elastic part which is elastically deformable for permitting variations in size of the battery element connected to the negative-electrode case member and the positive collector plate, in the extending directions of the positive electrode lead portions and the negative electrode lead portions.

8. The sealed battery according to claim 5, wherein each of the positive electrode plates of the power generation element includes a positive electrode lead portion having no positive electrode active material layer and extending in a direction opposite the direction for the negative electrode lead portion, the sealed battery further comprises:

a positive collector plate made of an electrically conductive material and to which the positive electrode lead portions are connected; and an external positive terminal electrically connected to the positive collector plate and fixed in the battery case so that a part of the external positive terminal is exposed to the outside of the case, at least one of the positive collector plate and the external positive terminal includes an elastic part which is elastically deformable for permitting variations in size of the battery element connected to the negative-electrode case member and the positive collector plate, in the extending directions of the positive electrode lead portions and the negative electrode lead portions.

9. A method of manufacturing a sealed battery comprising:

a power generation element including a plurality of positive electrode plates each having a positive electrode active material layer and a plurality of negative electrode plates each having a negative electrode active material layer, the positive and negative electrode plates being are alternately laminated so that a separator is interposed therebetween, each of the negative electrode plates including a negative electrode lead portion having no negative electrode active material layer and extending in a predetermined direction; and a battery case which houses the power generation element and includes a main case member housing the power generation element and a negative-electrode case member placed to seal the main case member and made of an electrically conductive material to serve as a negative collector plate to which the negative electrode lead portions are connected, and the negative-electrode case member including a flat plate part to which the negative electrode lead portions are connected, and side walls extending from peripheral edges of the plate part and perpendicular to the plate part, the side walls being in abutting contact with an open end of the main case member to seal it, wherein the method comprising the steps of:

connecting the negative electrode lead portions of the power generation element to the plate part of the negative-electrode case member; and inserting the power generation element connected to the negative-electrode case member into the main case member and connecting the side walls of the negative-electrode case member to the main case member in abutting contact with the open end of the main case member to seal the main case member.

10. A sealed battery comprising:

a power generation element including a plurality of positive electrode plates each having a positive electrode active material layer and a plurality of negative electrode plates each having a negative electrode active material layer, the positive and negative electrode plates being alternately laminated so that a separator is interposed therebetween, each of the positive electrode plates including a positive electrode lead portion having no positive electrode active material layer and extending in a predetermined direction; and a battery case which houses the power generation element, wherein the battery case includes a positive-electrode case member that constitutes a part of the battery case, is made of an electrically conductive material to serve as a positive collector plate to which the positive electrode lead portions are connected, and a main case member that houses the power generation element and is sealed by the positive-electrode case member, the positive-electrode case member includes a flat plate part to which the positive electrode lead portions are connected, and side walls extending from peripheral edges of the plate part and perpendicular to the plate part, the side walls being in abutting contact with an open end of the main case member to seal it.

11. The sealed battery according to claim 10, wherein the open end of the main case member and the side walls of the positive-electrode case member are connected to each other by a laser or electron beam, and a joint portion between the main case member and the positive-electrode case member is located within a region covering the positive electrode lead portions of the positive electrode plates in a direction perpendicular to the plate part.

12. The sealed battery according to claim 10, wherein each of the side walls of the positive-electrode case member includes a shielding protrusion located at an end of each side wall to protrude therefrom and inserted in the open end of the main case member.

13. The sealed battery according to claim 10, wherein each of the negative electrode plates of the power generation element includes a negative electrode lead portion having no negative electrode active material layer and extending in a direction opposite the direction for the positive electrode lead portion, the sealed battery further comprises:

a negative collector plate made of an electrically conductive material and to which the negative electrode lead portions are connected; and an external negative terminal electrically connected to the negative collector plate and fixed in the battery case so that a part of the external negative terminal is exposed to the outside of the case, at least one of the negative collector plate and the external negative terminal includes an elastic part which is elastically deformable for permitting variations in size of the battery element connected to the positive-electrode case member and the negative collector plate, in the extending directions of the positive electrode lead portions and the negative electrode lead portions.

14. The sealed battery according to claim 11, wherein each of the side walls of the positive-electrode case member includes a shielding protrusion located at an end of each side wall to protrude therefrom and inserted in the open end of the main case member.

15. The sealed battery according to claim 11, wherein each of the negative electrode plates of the power generation element includes a negative electrode lead portion having no negative electrode active material layer and extending in a direction opposite the direction for the positive electrode lead portion, the sealed batter further comprises:

a negative collector plate made of an electrically conductive material and to which the negative electrode lead portions are connected; and an external negative terminal electrically connected to the negative collector plate and fixed in the battery case so that a part of the external negative terminal is exposed to the outside of the case, at least one of the negative collector plate and the external negative terminal includes an elastic part which is elastically deformable for permitting variations in size of the battery element connected to the positive-electrode case member and the negative collector plate, in the extending directions of the positive electrode lead portions and the negative electrode lead portions.

16. The sealed battery according to claim 12, wherein each of the negative electrode plates of the power generation element includes a negative electrode lead portion having no negative electrode active material layer and extending in a direction opposite the direction for the positive electrode lead portion, the sealed battery further comprises:

a negative collector plate made of an electrically conductive material and to which the negative electrode lead portions are connected; and an external negative terminal electrically connected to the negative collector plate and fixed in the battery case so that a part of the external negative terminal is exposed to the outside of the case, at least one of the negative collector plate and the external negative terminal includes an elastic part which is elastically deformable for permitting variations in size of the battery element connected to the positive-electrode case member and the negative collector plate, in the extending directions of the positive electrode lead portions and the negative electrode lead portions.

17. The sealed battery according to claim 14, wherein each of the negative electrode plates of the power generation element includes a negative electrode lead portion having no negative electrode active material layer and extending in a direction opposite the direction for the positive electrode lead portion, the sealed battery further comprises:

a negative collector plate made of an electrically conductive material and to which the negative electrode lead portions are connected; and an external negative terminal electrically connected to the negative collector plate and fixed in the battery case so that a part of the external negative terminal is exposed to the outside of the case, at least one of the negative collector plate and the external negative terminal includes an elastic part which is elastically deformable for permitting variations in size of the battery element connected to the positive-electrode case member and the negative collector plate, in the extending directions of the positive electrode lead portions and the negative electrode lead portions.

18. A method of manufacturing a sealed battery comprising:

a power generation element including a plurality of positive electrode plates each having a positive electrode active material layer and a plurality of negative electrode plates each having a negative electrode active material layer, the positive and negative electrode plates being are alternately laminated so that a separator is interposed therebetween, each of the positive electrode plates including a positive electrode lead portion having no positive electrode active material layer and extending in a predetermined direction; and a battery case which houses the power generation element and includes a main case member housing the power generation element and a positive-electrode case member placed to seal the main case member and made of an electrically conductive material to serve as a positive collector plate to which the positive electrode lead portions are connected, and the positive-electrode case member including a flat plate part to which the positive electrode lead portions are connected, and side walls extending from peripheral edges of the plate part and perpendicular to the plate part, the side walls being in abutting contact with an open end of the main case member to seal it, wherein the method comprising the steps of:

connecting the positive electrode lead portions of the power generation element to the plate part of the positive-electrode case member; and inserting the power generation element connected to the positive-electrode case member into the main case member and connecting the side walls of the positive-electrode case member to the main case member in abutting contact with the open end of the main case member to seal the main case member.

* * * * *